United States Patent
Kunii et al.

(10) Patent No.: US 8,311,192 B2
(45) Date of Patent: Nov. 13, 2012

(54) COMMUNICATION DEVICE, COMMUNICATION SYSTEM AND COMPUTER READABLE MEDIUM FOR COMMUNICATION

(75) Inventors: Tadahiro Kunii, Nagoya (JP); Tetsuya Kato, Aichi-ken (JP); Hirofumi Oguri, Nagoya (JP); Ryoji Yamaguchi, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 854 days.

(21) Appl. No.: 12/337,364

(22) Filed: Dec. 17, 2008

(65) Prior Publication Data

US 2009/0154677 A1   Jun. 18, 2009

(30) Foreign Application Priority Data

Dec. 18, 2007 (JP) ................................ 2007-325869
Mar. 13, 2008 (JP) ................................ 2008-064309

(51) Int. Cl.
*H04M 11/00* (2006.01)

(52) U.S. Cl. ................ 379/93.23; 379/93.09; 379/93.19

(58) Field of Classification Search ............... 379/88.13, 379/93.09, 100.01, 100.12, 100.13, 100.14, 379/100.16, 93.19, 93.23
See application file for complete search history.

(56) References Cited

U.S. PATENT DOCUMENTS

| | | | |
|---|---|---|---|
| 5,347,628 A | 9/1994 | Brewer et al. | |
| 5,542,039 A | 7/1996 | Brinson et al. | |
| 5,545,857 A | 8/1996 | Lee et al. | |
| 6,040,831 A | 3/2000 | Nishida | |
| 6,081,266 A | 6/2000 | Sciammarella | |
| 6,292,210 B1 | 9/2001 | Gerszberg et al. | |
| 6,587,596 B1 | 7/2003 | Haeberli | |
| 6,850,254 B1 | 2/2005 | Banning et al. | |
| 7,035,865 B2 * | 4/2006 | Doss et al. ............................ | 1/1 |
| 7,080,324 B1 | 7/2006 | Nelson et al. | |
| 7,284,002 B2 * | 10/2007 | Doss et al. ............................ | 1/1 |
| 7,664,485 B2 * | 2/2010 | Twerdahl et al. ............. | 455/408 |
| 7,782,244 B2 | 8/2010 | McRae | |
| 7,783,290 B2 | 8/2010 | Kim | |
| 8,064,902 B2 * | 11/2011 | Kunii ........................ | 455/426.1 |
| 8,089,389 B2 | 1/2012 | McRae | |
| 8,132,110 B1 | 3/2012 | Appelman et al. | |

(Continued)

FOREIGN PATENT DOCUMENTS

CN    1652565 A    8/2005

(Continued)

OTHER PUBLICATIONS

Japan Patent Office, Notification of Reasons for Rejection for Japanese Patent Application No. 2008-064321 (counterpart to above-captioned patent application), dispatched Jun. 8, 2010.

(Continued)

*Primary Examiner* — Lisa Hashem
(74) *Attorney, Agent, or Firm* — Baker Botts L.L.P.

(57) ABSTRACT

There is provided a communication device, comprising: a display screen; a communication unit; an image data storage unit storing of image data; a registration information storage unit to store registration information and area information in such a manner that the area information is associated with the registration information; and an output control unit to display an image corresponding to image data associated with registration information corresponding to a source which transmitted a communication request such that an area corresponding to the source is distinguished from other areas.

24 Claims, 21 Drawing Sheets

U.S. PATENT DOCUMENTS

| | | | |
|---|---|---|---|
| 2002/0090068 A1* | 7/2002 | Song | 379/88.13 |
| 2002/0097262 A1 | 7/2002 | Iwase et al. | |
| 2004/0102225 A1 | 5/2004 | Furuta et al. | |
| 2004/0171394 A1 | 9/2004 | Daita | |
| 2004/0207722 A1 | 10/2004 | Koyama et al. | |
| 2005/0120307 A1 | 6/2005 | Suzuki | |
| 2006/0004712 A1 | 1/2006 | Hakala et al. | |
| 2006/0063562 A1 | 3/2006 | Hirai | |
| 2006/0135197 A1* | 6/2006 | Jin et al. | 455/550.1 |
| 2007/0035564 A1 | 2/2007 | Katsuyama | |
| 2007/0083651 A1* | 4/2007 | Ishida | 709/224 |
| 2008/0070553 A1* | 3/2008 | Yamakawa et al. | 455/413 |
| 2008/0084576 A1 | 4/2008 | Dantwala | |
| 2008/0129580 A1 | 6/2008 | McRae | |
| 2008/0180304 A1 | 7/2008 | McRae | |
| 2008/0180305 A1 | 7/2008 | McRae | |
| 2008/0207231 A1 | 8/2008 | Kunii | |
| 2009/0021761 A1 | 1/2009 | Suzuki et al. | |
| 2009/0027721 A1 | 1/2009 | Misumi et al. | |
| 2009/0074159 A1* | 3/2009 | Goldfarb et al. | 379/88.13 |
| 2009/0153885 A1* | 6/2009 | Yamaguchi et al. | 358/1.5 |
| 2009/0153903 A1* | 6/2009 | Kunii et al. | 358/1.16 |
| 2009/0154677 A1 | 6/2009 | Kunii et al. | |
| 2009/0168115 A1* | 7/2009 | Kunii | 358/444 |
| 2010/0248703 A1* | 9/2010 | Mears et al. | 455/415 |
| 2011/0074700 A1* | 3/2011 | Sharp | 345/173 |
| 2011/0123009 A1* | 5/2011 | Mears et al. | 379/93.23 |
| 2011/0161856 A1* | 6/2011 | Nurmi et al. | 715/772 |

FOREIGN PATENT DOCUMENTS

| | | |
|---|---|---|
| JP | H03-222033 A | 10/1991 |
| JP | H05-091179 A | 4/1993 |
| JP | H09-034392 A | 2/1997 |
| JP | H09-034483 A | 2/1997 |
| JP | H09-083630 A | 3/1997 |
| JP | 2002-232555 A | 8/2002 |
| JP | 2004-140695 A | 5/2004 |
| JP | 2004-201222 A | 7/2004 |
| JP | 2004-260657 A | 9/2004 |
| JP | 2004-304719 A | 10/2004 |
| JP | 2006-042170 A | 2/2006 |
| JP | 2006-093863 A | 4/2006 |
| JP | 2006-165821 A | 6/2006 |
| JP | 2006-222504 A | 8/2006 |
| JP | 2007-028077 A | 2/2007 |
| JP | 2007-068234 A | 3/2007 |
| JP | 2007-201906 A | 8/2007 |
| JP | 2009-147566 A | 7/2009 |

OTHER PUBLICATIONS

The State Intellectual Property Office of the People's Republic of China, Notification of First Office Action for Chinese Patent Application No. 200810186729.7 (counterpart to above-captioned patent application), issued Aug. 5, 2010.

* cited by examiner

FIG.3A

| PERSONAL INFORMATION | NAME | PHONE NUMBER | |
|---|---|---|---|
| 1 | Jiro SUZUKI | 052-xxx-1111 | |
| 2 | Taro KATO | 052-xxx-2222 | |
| 3 | A. KIMURA | 052-xxx-3333 | |
| 4 | B. TAKAHASHI | 052-xxx-4444 | |
| 5 | C. SATO | 052-xxx-5555 | |

| IMAGE NAME | AREA INFORMATION | | | | PERSON NUMBER | |
| --- | --- | --- | --- | --- | --- | --- |
| | X-DIRECTION | Y-DIRECTION | SHAPE | SIZE | | |
| FRIENDS | 7 | 5 | ELLIPSE 2 | 1.6 | 1 | (SUZUKI) |
| | 5 | 7 | CIRCLE | 1.8 | 2 | (KATO) |
| | 2 | 6 | ELLIPSE 2 | 1.3 | 3 | (KIMURA) |

| IMAGE NAME | AREA INFORMATION | | | | PERSON NUMBER | |
| --- | --- | --- | --- | --- | --- | --- |
| | X-DIRECTION | Y-DIRECTION | SHAPE | SIZE | | |
| COLLEAGUE | 9 | 3 | ELLIPSE 2 | 1.2 | 1 | (SUZUKI) |
| | 2 | 2 | CIRCLE | 1.5 | 4 | (TAKAHASHI) |
| | 6 | 6 | CIRCLE | 1.1 | 5 | (SATO) |

(14b2, Q1, Q2, Q3)

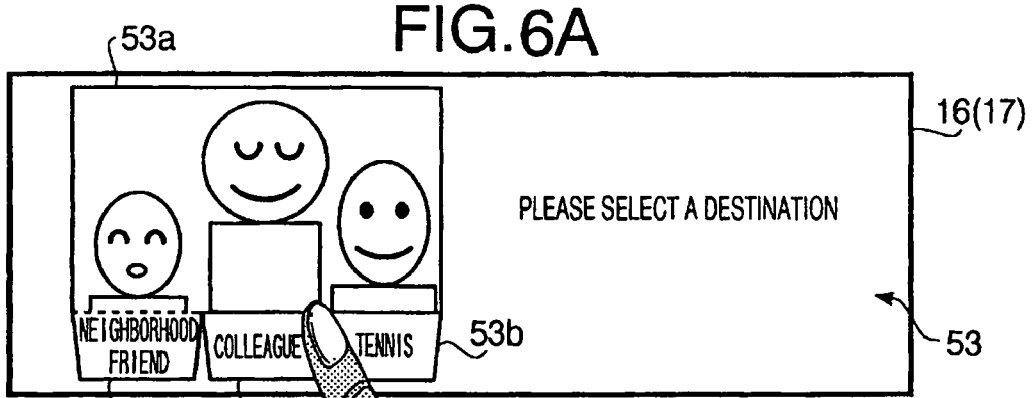
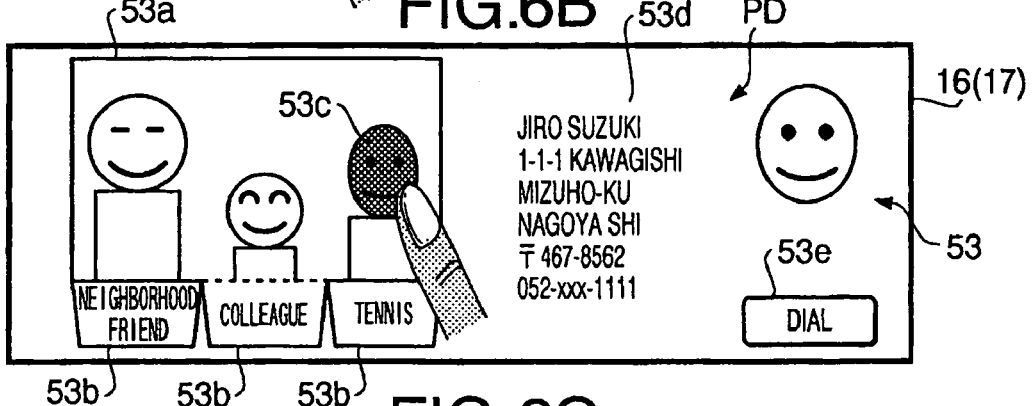
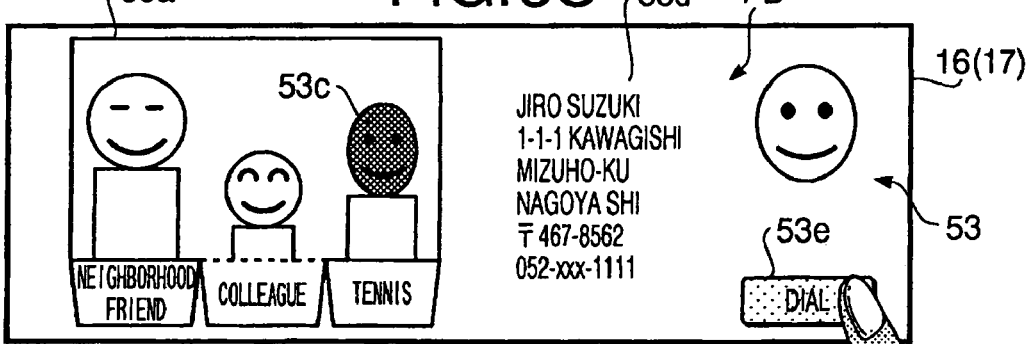
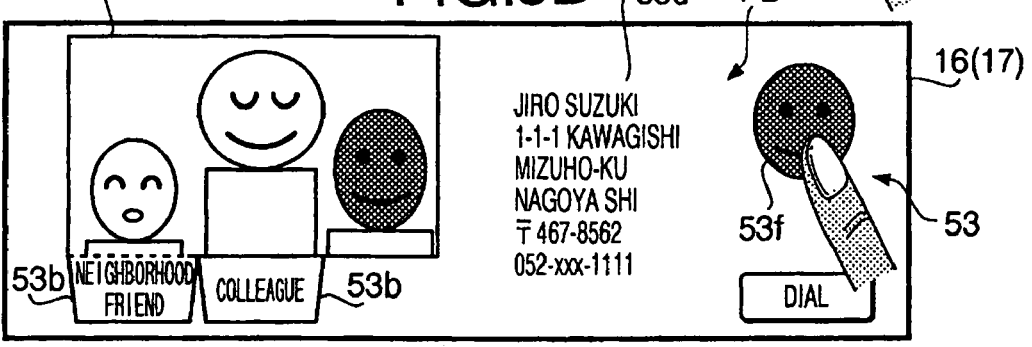

| IMAGE NAME | AREA INFORMATION | | | | NAME | PHONE NUMBER | PERSON NUMBER | |
|---|---|---|---|---|---|---|---|---|
| | X-DIRECTION | Y-DIRECTION | SHAPE | SIZE | | | | |
| NEIGHBORHOOD | 7 | 5 | ELLIPSE 2 | 1.6 | Jiro SUZUKI | 052-xxx-1111 | A1 | (SUZUKI) |
| | 5 | 7 | CIRCLE | 1.8 | Taro KATO | 052-xxx-2222 | A2 | (KATO) |
| | 2 | 6 | ELLIPSE 2 | 1.3 | A. KIMURA | 052-xxx-3333 | A3 | (KIMURA) |

| IMAGE NAME | AREA INFORMATION | | | | NAME | PHONE NUMBER | PERSON NUMBER | |
|---|---|---|---|---|---|---|---|---|
| | X-DIRECTION | Y-DIRECTION | SHAPE | SIZE | | | | |
| COLLEAGUE | 9 | 3 | ELLIPSE 2 | 1.2 | | | A1 | (SUZUKI) |
| | 2 | 2 | CIRCLE | 1.5 | B.TAKAHASHI | 052-xxx-4444 | B4 | (TAKAHASHI) |
| | 6 | 6 | CIRCLE | 1.1 | C. SATO | 052-xxx-5555 | B5 | (SATO) |

R1, R2, R3, R4, R5, PD, L2

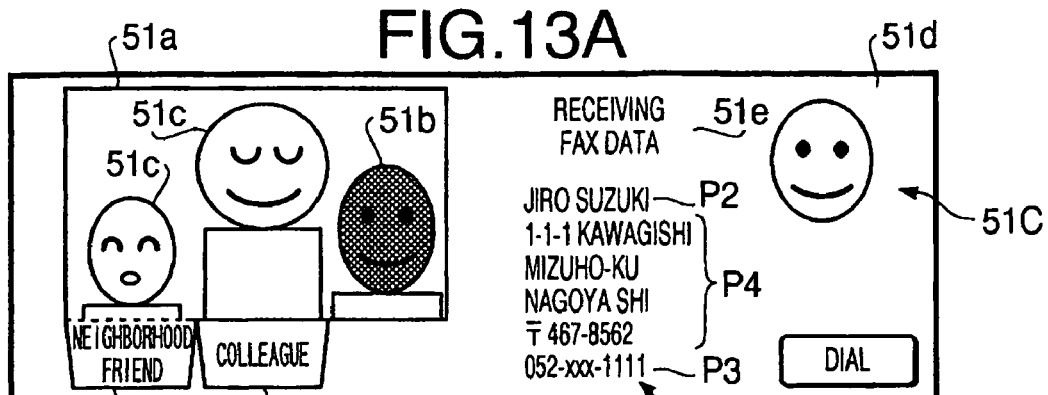
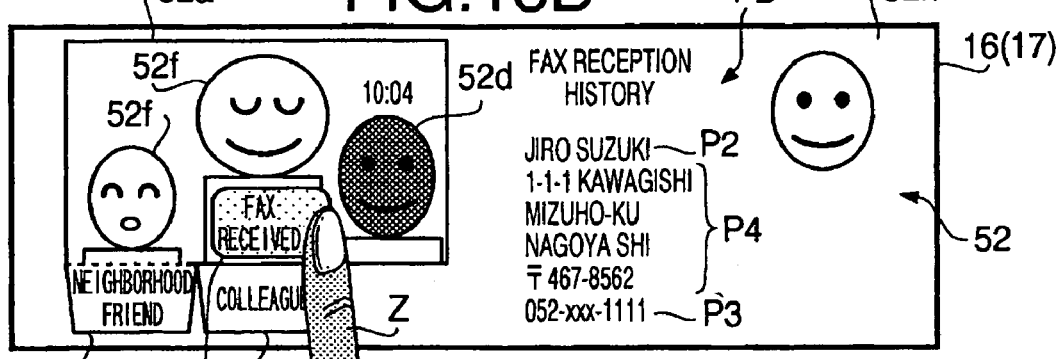
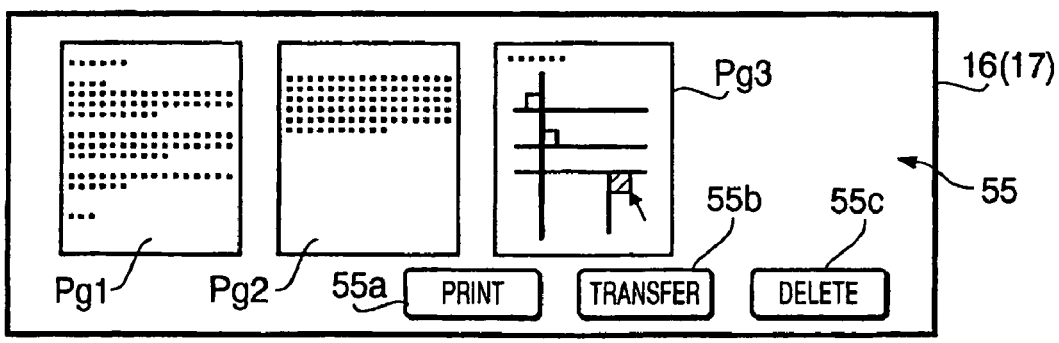

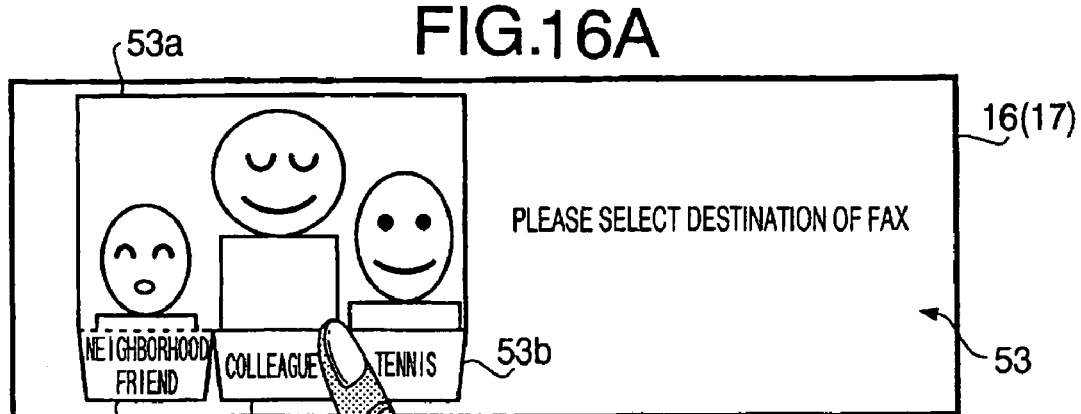
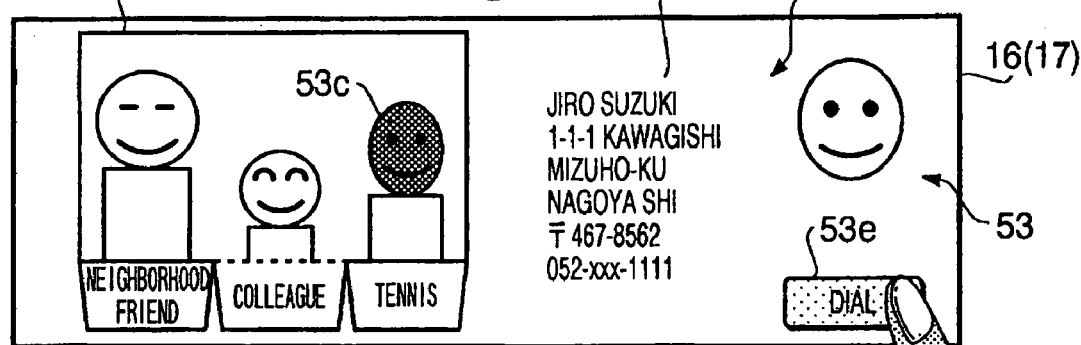
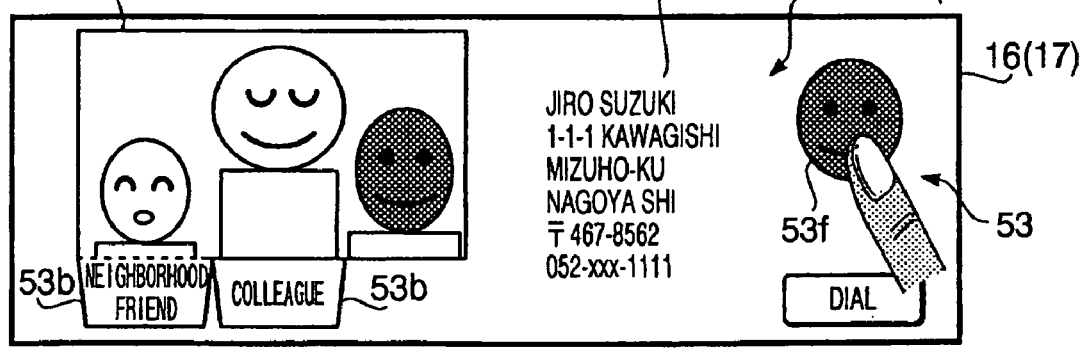

COMMUNICATION DEVICE, COMMUNICATION SYSTEM AND COMPUTER READABLE MEDIUM FOR COMMUNICATION

CROSS-REFERENCE TO RELATED APPLICATION

This application claims priority under 35 U.S.C. §119 from Japanese Patent Applications Nos. 2007-325869, filed on Dec. 18, 2007, and 2008-064309, filed on Mar. 13, 2008. The entire subject matter of the applications is incorporated herein by reference.

BACKGROUND

1. Technical Field

Aspects of the present invention relate to a communication device and a communication system.

2. Related Art

Various types of communication devices, such as a mobile phone and a multifunction device having a telephone function, have been widely used. Japanese Patent Provisional Publication No. 2007-68234A (hereafter, referred to as JP2007-68234A) disclosed an example of a mobile phone. The mobile phone disclosed in JP2007-68234A displays an incoming call history screen in such a manner that if a party stored in the incoming call history is a registered person whose personal information and a facial photograph have been registered in the mobile phone, the facial portrait of the party is displayed in the incoming call history screen together with the personal information of the party.

SUMMARY

As described above, the mobile phone disclosed in JP2007-68234A enables a user visually recognize the party through the facial photograph displayed in the screen. However, it should be noted that the mobile phone disclosed in JP2007-68234A provides merely a facial photograph of the party on the screen. In other words, the mobile phone disclosed in JP2007-68234A is not able to provide information allowing the user to recognize the relationship between persons including the user, the party and another person.

Aspects of the present invention are advantageous in that at least one of a communication device, a communication system and a computer readable medium capable of enabling a user to easily recognize a source of communication is provided.

According to an aspect of the invention, there is provided a communication device, comprising: a display screen; a communication unit configured to communicate with an external device; an image data storage unit configured to store image data; a registration information storage unit configured to store registration information and area information corresponding to a plurality of areas defined in the image data in such a manner that the area information is associated with the registration information; and an output control unit configured to control onscreen representation on the display screen. In this configuration, the output control unit comprises a first control unit configured to display an image corresponding to the image data associated with the registration information corresponding to a source which transmitted a communication request such that an area defined by the area information associated with the registration information corresponding to the source which transmitted the communication request is distinguished from other areas defined by corresponding area information.

Such a configuration enables the user to easily recognize the source which transmitted the communication request through the image being displayed on the display screen. By comparing the area representing the source and other areas associated with other registration information, the user is able to obtain indirect information (e.g., the relationship between persons including the source).

According to another aspect of the invention, there is provided a computer readable medium having computer readable instruction stored thereon, which, when executed by a processor of a communication device comprising a display screen, a communication unit configured to communicate with an external device, an image data storage unit configured to store image data, and a registration information storage unit configured to store registration information and area information corresponding to a plurality of areas defined in the image data in such a manner that each of the area information is associated with the registration information, configures the processor to perform the steps of: generating an image corresponding to the image data associated with the registration information corresponding to a source which transmitted a communication request, in such a manner that an area defined by the area information associated with the registration information corresponding to the source which transmitted the communication request is distinguished from other areas defined by corresponding area information; and displaying the generated image on the display screen.

Such a configuration enables the user to easily recognize the source which transmitted the communication request through the image being displayed on the display screen. By comparing the area representing the source and other areas associated with other registration information, the user is able to obtain indirect information (e.g., the relationship between persons including the source).

According to another aspect of the invention, there is provided a communication system, comprising: a communication device having a communication unit configured to communicate with an external device; an information processing device having a display screen and an output control unit configured to control onscreen representation on the display screen; an image data storage unit configured to store image data; and a registration information storage unit configured to store registration information and area information corresponding to a plurality of areas defined in the image data in such a manner that the area information is associated with the registration information. In this configuration, the output control unit of the information processing device is configured to display an image corresponding to the image data associated with the registration information corresponding to a source which transmitted a communication request, in such a manner that an area defined by the area information associated with the registration information corresponding to the source which transmitted the communication request is distinguished from other areas defined by corresponding area information.

Such a configuration enables the user to easily recognize the source which transmitted the communication request through the image being displayed on the display screen. By comparing the area representing the source and other areas associated with other registration information, the user is able to obtain indirect information (e.g., the relationship between persons including the source).

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

FIG. 3A illustrates an example of a data structure of data stored in a personal information memory.

FIGS. 3B and 3C illustrate examples of data structures of data stored in an image information memory.

FIGS. 6A-6D illustrate examples of calling screens displayed on the LCD during execution of a calling process.

FIGS. 11A and 11B illustrate an example of a data structure of a telephone book memory.

FIGS. 13A-13C illustrate screens displayed during execution of processes shown in FIGS. 14 and 15.

FIG. 13D illustrates a screen in which an image representing contents of received FAX data is displayed.

FIGS. 16A-16D illustrate examples of transmission screens displayed on the LCD during execution of a FAX transmission process.

DETAILED DESCRIPTION

Hereafter, embodiments will be described with reference to the accompanying drawings.

First Embodiment

Figure 1:
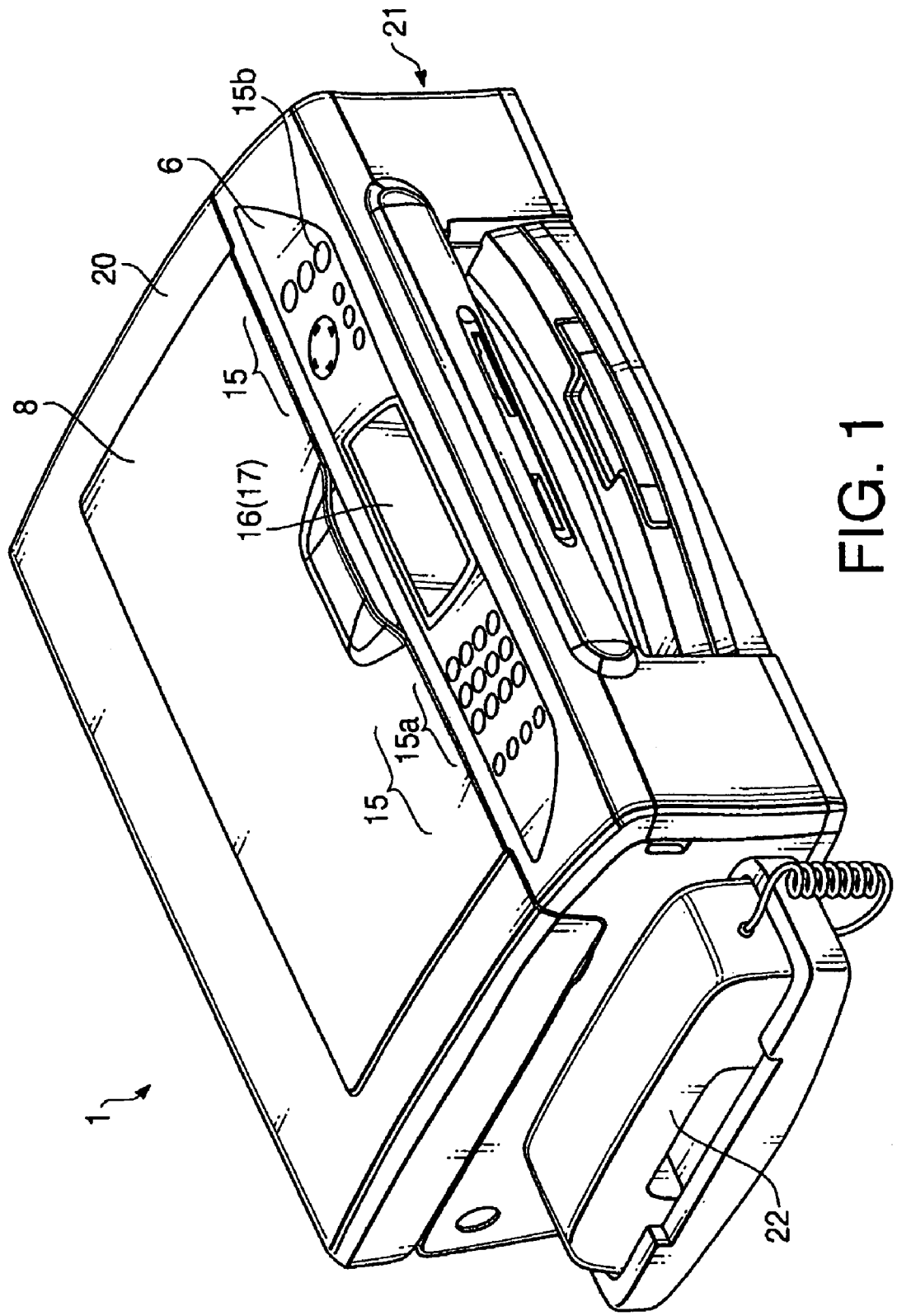
FIG. 1 is a perspective view illustrating an outer appearance of an MFP (Multi-Function Peripheral) according to a first embodiment.

FIG. 1 is a perspective view illustrating an outer appearance of an MFP 1 (Multi-Function Peripheral) according to a first embodiment. The MFP 1 has a telephone function and a facsimile function which are achieved through a telephone network 100. Further, the MFP 1 has a scanner function, a copying function, a PC print function and a medium print function. As described in detail later, the MFP 1 is configured to allow a user to easily recognize a party on the other side (e.g., a party who requested communication or a destination with which a user wants to communicate).

On the top of the MFP 1, a scanner 20 which reads an image from a document for the facsimile function, the scanner function or the copying function is located. Under a document cover 8, a platen glass on which a document is placed is located. When a user operates the MFP 1 to read a document, the user opens the document cover 9 upward, places the document on the platen glass, and then closes the document cover 8 to fix the document.

When execution of a reading process is instructed by the user, a sensor located under the platen glass operates to read the document. Image data obtained by reading the document is then stored in a predetermined area in a RAM 13 (see FIG. 2).

In a body case of the MFP 1, a print unit 21 functioning as an inkjet printer is accommodated. The print unit 21 is able to execute color printing. The print unit 21 has a print head which uses four colors of ink of cyan (C), magenta (M), yellow (Y) and black (K), a paper feed unit, and a recovering unit. More specifically, the print head is provided with a plurality of nozzles, and the print head executes a print process for printing an image on a sheet of paper being conveyed by the paper feed unit while ejecting ink from the plurality of nozzles.

On the front side of the document cover 8, an operation panel 6 having a rectangular shape elongated in a lateral direction is provided. On the operation panel 6, operation keys 15 and an LCD 16 on which a touch panel 17 is integrally provided are located. The operation keys 15 include various types of buttons, such as numeric keys 15a for inputting a phone number for the telephone and facsimile functions, and a power button 15b for turning on or off the MFP 1.

The LCD 16 is a display screen on which various types of information is displayed. For example, a status of a process running on the MFP 1 or information concerning a user input through the operation keys 15 or the touch panel 17 is displayed.

When the telephone function or the facsimile function of the MFP 1 is used, a reception screen 51 (see, for example, FIG. 4A) or an unattended time incoming history screen 52 (see, for example, FIG. 4B), or a calling screen 53 (see, for example, FIG. 6B) is displayed on the LCD 16. As described in detail later, when the MFP 1 displays a screen (e.g., a calling screen 55), the MFP 1 displays information of a person registered in a telephone book memory 14b (see FIG. 2). That is, the MFP 1 displays information concerning a registered person (hereafter, referred to as personal information) and an image containing the registered person.

On a side wall of the MFP 1, a handset 22 is provided. The handset 22 is used for telephone communication with a party on the other side through the telephone function. During a non-communication state, the handset 22 is placed on a base on which a hook is located, while the handset 22 is picked up from the base by the user during a communication state. In this embodiment, the state where the handset 22 is placed on the base is referred to as an on-hook state, and the state where the handset 22 is picked up from the base is referred to as an off-hook state. During the off-hook state, the handset 22 is electrically connected to an NCU 23 (see FIG. 2). During the on-hook state, the electrical connection between the handset 22 and the NCU 23 is released.

Figure 2:
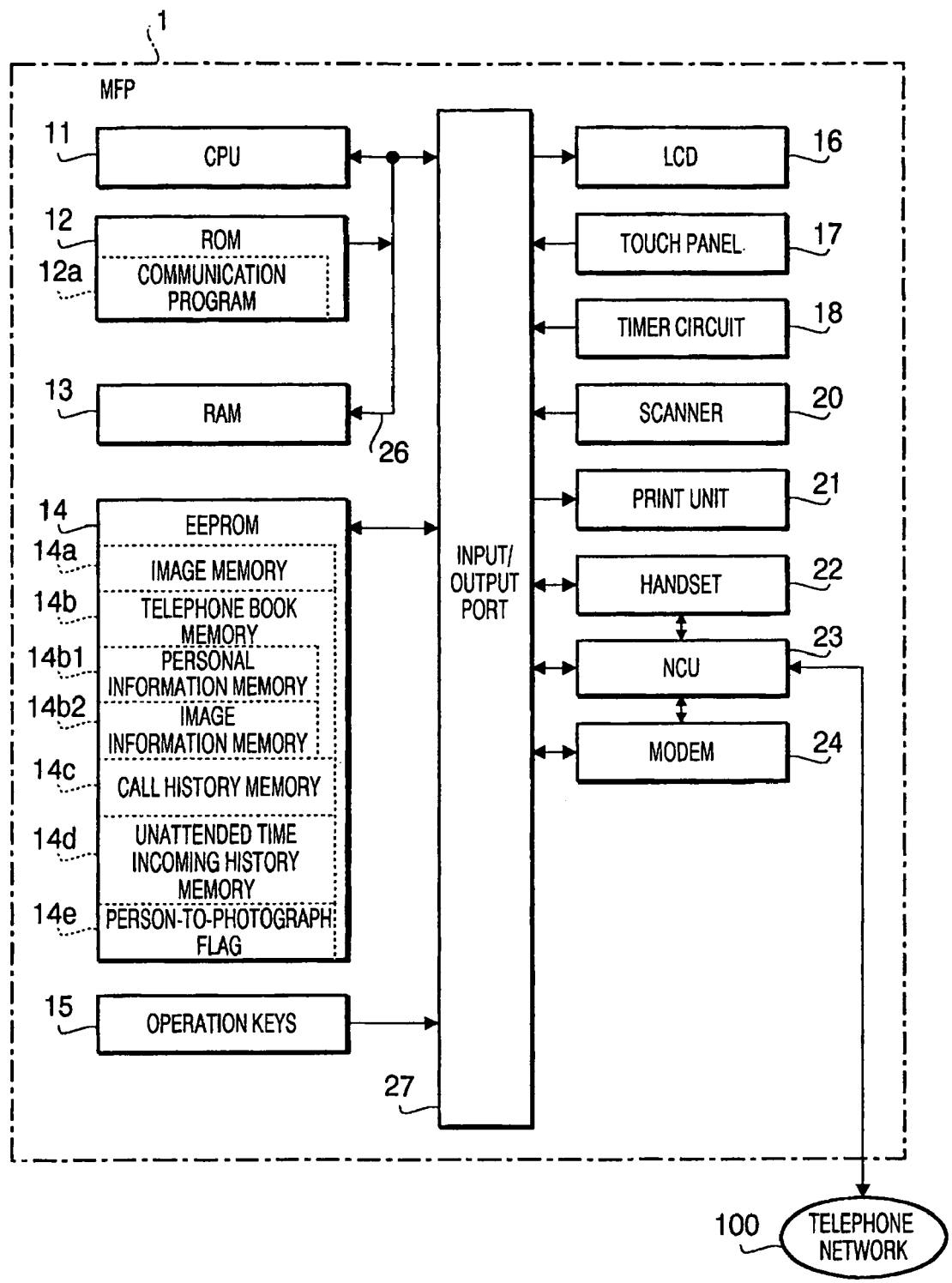
FIG. 2 is a block diagram illustrating a control system of the MFP.

Hereafter, a control system of the MFP 1 is explained with reference to FIG. 2. FIG. 2 is a block diagram illustrating the control system of the MFP 1. As shown in FIG. 2, the MFP 1 includes a CPU 11, a ROM 12, a RAM 13, an EEPROM 14, the operation keys 15, the LCD 16, the touch panel 17, a timer circuit 18, the scanner 20, the print unit 21, the handset 22, the NCU 23, and a modem 24.

The CPU 11, the ROM 12 and the RAM 13 are connected to each other via a bus line 26. The EEPROM 14, the operation keys 15, the LCD 16, the touch panel 17, the timer circuit 18, the scanner 20, the print unit 21, the handset 22, the NCU 23, the modem 24 and the bus line 26 are connected to each other via an input/output port 27.

In accordance with programs and fixed values stored in the ROM 12 or the RAM 13 or various signals transmitted or received through the NCU 23, the CPU 11 controls the functions and the components provided in the MFP 1 through the input/output port 27.

The ROM 21 stores control programs to be executed by the CPU 11 and the fixed values. As described in detail later, by executing processes show in FIGS. 5 and 7 corresponding to a communication program 12a stored in the ROM 12, the MFP 1 operates to allow the user to easily recognize the party on the other side (i.e., a person of a destination or a person of an incoming call). The MFP 1 has a memory area on which the communication program is loaded. The RAM 13 is used as a work memory for temporarily storing various types of data during execution of various types of processes.

The EEPROM 14 (which is a rewritable memory) is a non-volatile memory capable of maintaining stored data during a power-off state of the MFP 1. As shown in FIG. 2, the EEPROM 14 includes an image memory 14a, a telephone book memory 14b, a call history memory 14c, an unattended time incoming history memory 14d, and a person-to-photograph flag 14e.

The image memory 14a is used to store image data. For example, the image memory 14a stores image data transmitted from an image pick-up device (e.g., a digital camera) or an external computer attached to the MFP 1 via an interface (not shown), image data read from an external memory (e.g., SD Card®) attached to a medium slot (not shown) of the MFP 1, or image data of a photograph read by the scanner 20.

The telephone book memory 14b stores information (e.g., a telephone number or an e-mail address) specifying a person as a party during the telephone function or the facsimile function. The telephone book memory 14b further stores information (e.g., a name or a residential address) identifying a person as a party during the telephone function or the facsimile function.

As described in detail later, the MFP 1 is able to use images as information for the telephone book. As shown in FIG. 2, the telephone book memory 14b includes a personal information memory 14b1 for storing personal information, such as a name and a phone number, and an image information memory 14b2 functioning as an memory area for associating the personal information with image data. The personal information memory 14b1 and the image information memory 14b2 will be explained later with reference to FIG. 3.

When the user starts a call, the call history memory 14c stores a calling time, information specifying the party on the other side (e.g., a phone number), a photograph which has been displayed on a display area 53a of the calling screen 53. Hereafter, history information stored in the call history memory 14c is referred to as "call history data".

When the MFP 1 receives a communication request from a party and the communication request terminates without starting communication for the communication request on the MFP 1, the unattended time incoming history memory 14d stores history data (e.g., information representing a party on the other side, such as a phone number, and the time when the communication request is received). Such history data stored in the unattended time incoming history memory 14d is referred to as "unattended time incoming history data".

The person-to-photograph flag 14e is data indicating whether the MFP 1 is in a mode where a photograph corresponding to the personal information should be extracted based on the personal information. An ON state of the person-to-photograph flag 14e indicates the MFP 1 is in the mode where the photograph corresponding to the personal information should be extracted based on the personal information. On the other hand, an OFF state of the person-to-photograph flag 14e indicates a mode where the personal information is extracted from the photograph.

The timer circuit 18 provides current date and time information. The NCU 23 which is connected to the telephone network 100 has functions of transmitting a dialing signal to the telephone network 100 and responding to an incoming call signal from the telephone network 100.

The modem 24 has functions of modulating image data for which execution of facsimile transmission is instructed into a signal transmittable on the telephone network 100, and demodulating a signal received from the telephone network 100 via the NCU 23 into image data which can be displayed on the LCD 16 or can be printed through the print unit 21.

Hereafter, data structures of the personal information memory 14b1 and the image information memory 14b2 are explained with reference to FIGS. 3A-3C. FIG. 3A illustrates an example of a data structure of data stored in the personal information memory 14b1. FIGS. 3B and 3C illustrate examples of data structures of data stored in the image information memory 14b2.

As shown in FIG. 3A, the personal information memory 14b1 stores a plurality of pieces of personal information PD associated with person numbers P1 respectively. That is, the personal information memory 14b1 stores, for each of registered persons, the person number P1 and the corresponding personal information PD.

The personal information PD includes a name P2 representing a name of a person, and a phone number P3 representing an address of the person. The personal information PD may include additional information, such as a residential address P4 and information concerning a property of a person. The information representing an address of a person may include an e-mail address.

The person number P1 is a unique number. That is, the person numbers P1 are numbers which are respectively assigned to registered persons and are different from each other. In the example shown in FIG. 3A, sequential numbers starting from one are assigned to the person numbers P1; however, the person number P1 is not limited to the example shown in FIG. 3A. For example, sequential numbers not starting from one may be used as the person numbers P1.

As shown in FIGS. 3B and 3C, the image information memory 14b2 stores area information Q2 and a person number Q3 for each of a plurality of pieces of image data to which image names are assigned, respectively.

The image name Q1 is a unique name. That is, each image name Q1 specifies a piece of mage data in the image information memory 14b2. A file name assigned to the image data or an internal number of image data may be used as the image name Q1.

FIG. 3B shows a data structure of data corresponding to a photograph (image) of a "neighborhood friend" in the image data memory 14a. FIG. 3C shows a data structure of data corresponding to a photographic of a "colleague".

The area information Q2 defines an area contained in a drawing area in the image data specified by the image name Q1. More specifically, the area information includes shape information representing a shape of the area, size information representing a size of the area, and coordinate information (X, Y positions) of the area specifying the position of the area in the image data. For example, the center position of the area may be used as the coordinate information.

The person number Q3 is a unique number specifying the personal information corresponding to the area specified by the area information Q2. The person number Q3 is selected from the person numbers P1 stored in the personal information memory 14b1 (see FIG. 3A). By associating the person number Q3 with the area specified by the area information Q2, the personal information PD corresponding to the person number Q3 stored in the personal information memory 14b1 is associated with the area specified by the area information Q2.

For example, as shown in FIG. 3B, if the area defined by (x-position of 7, y-position of 5, the shape of an ellipse, and the size of 1.6) in the photographic image of "neighborhood friend" is associated with the person number "1", the personal information PD corresponding to the person number "1" in the personal information memory 14b1 (see FIG. 3A) (i.e., the personal information corresponding to the name P2 of "Jiro SUZUKI" and the phone number P3 of "052-xxx-1111") is associated with the area.

As shown in FIG. 3B, in addition to the above described area corresponding to "Jiro SUZUKI", two areas are defined in the photograph of "neighborhood friend". The two areas are respectively corresponding to the personal information PD of the person number "2" (Taro KATO) and the personal information PD of the person number "3" (A. KIMURA). It should be noted that a plurality of pieces of personal information can be associated with a prices of image data (i.e., one photograph).

Similarly, in the photograph of "colleague", three areas are defined. The three areas respectively correspond to the personal information PD defined by the person number "1" (Jiro SUZUKI), the personal information PD defined by the person number "4" (B. TAKAHASHI), and the personal information PD defined by the person number "5" (C. SATOH) (see FIG. 3C).

It should be noted that the personal information PD of the same person specified by the person number "1" is associated with both of the photographs of "neighborhood friend" and "colleague". That is, since the MFP 1 is configured to specify the personal information PD in the personal information memory 14b1 by the person number Q1 (P1), there is no need to associating personal information with each of the plurality of pieces of image data. Therefore, even if the same personal information is to be associated with the plurality of pieces of image data, wasteful use of a memory area of the EEPRON 14 can be avoided.

If the need to associate the same personal information with a plurality of photographs arises, the MFP 1 is able to use the personal information PD which has been associated with a photograph (e.g., the photograph of "neighborhood friend") at an earlier stage so as to associate the personal information with a photograph (e.g., a photograph of "colleague") at a later stage. Such a configuration enables the CPU 11 of the MFP 1 to recognize the identity of the personal information associated with the plurality of photographs. That is, the CPU 11 is able to extract the same personal information PD from each of the plurality of photographs, and to extract, from the personal information, all of the photographs each of which contains the same personal information PD.

Figure 4A:
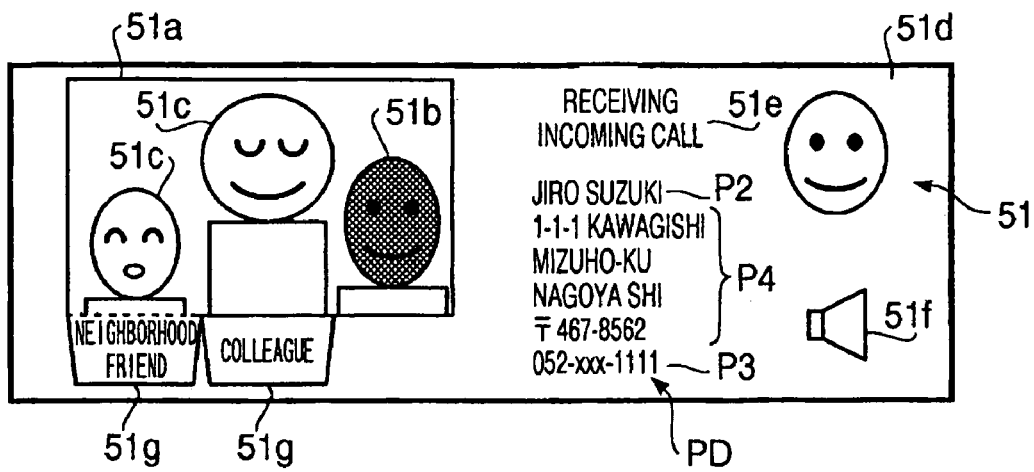
FIGS. 4A-4C illustrate screens displayed on an LCD of the MFP during an incoming call process.
Figure 4B:
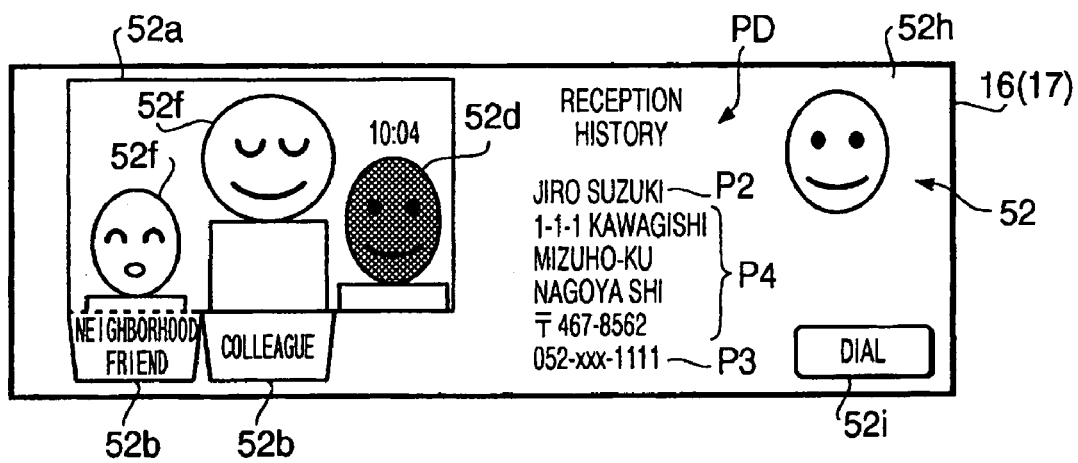
Figure 4C:
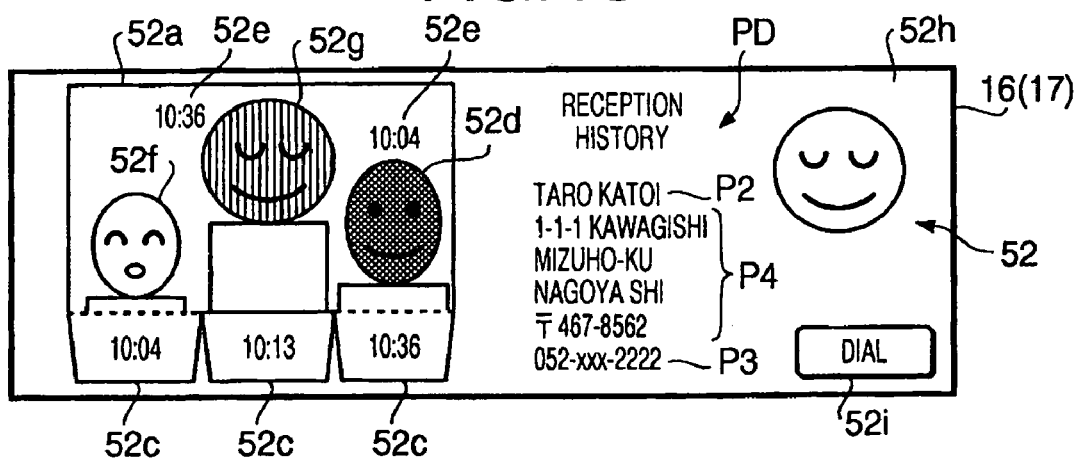
Figure 5:
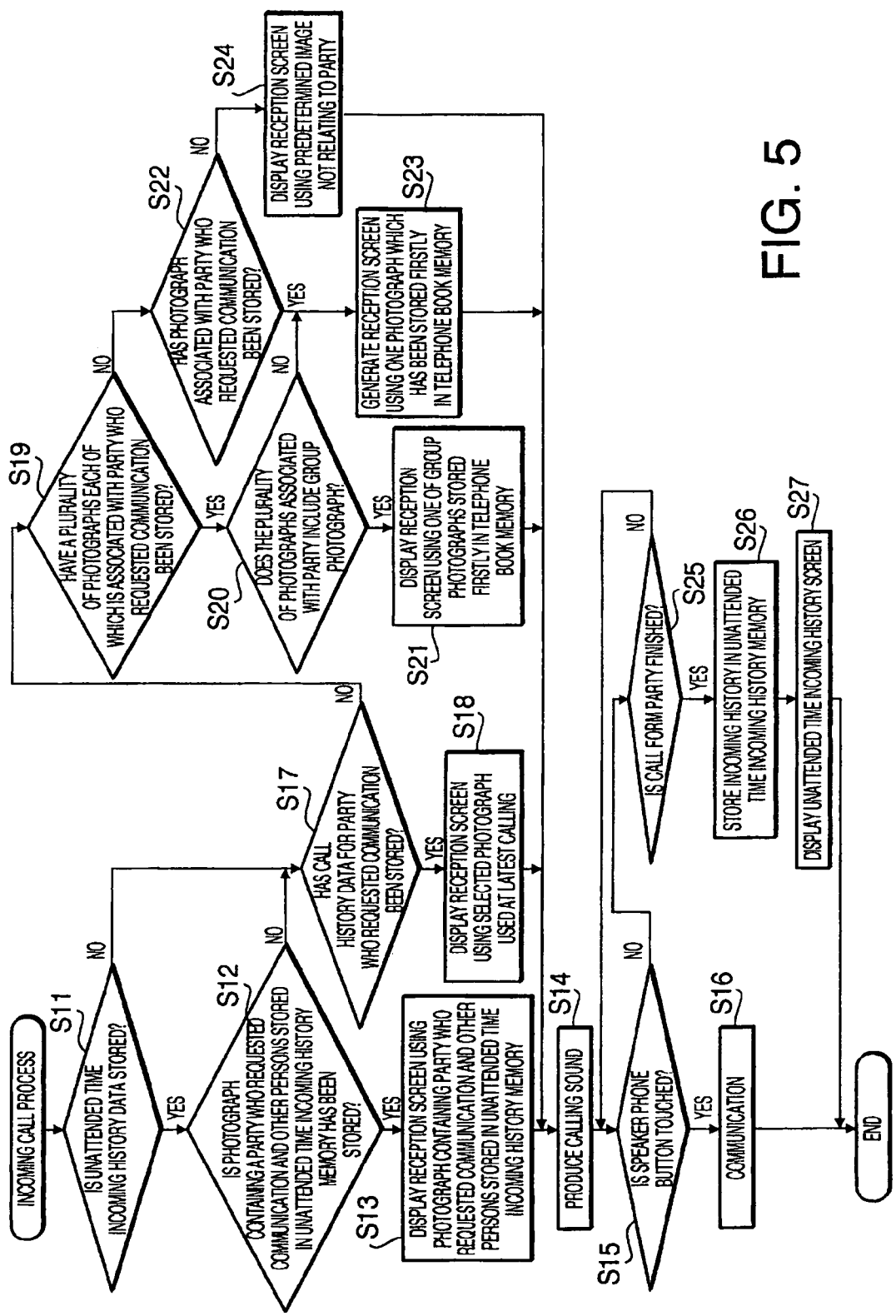
FIG. 5 is a flowchart illustrating an incoming call process executed by the MFP.

Hereafter, operations for notifying the user of a party requesting communication through a photograph stored in the telephone book memory 14b will be explained with reference to FIGS. 4A-4C and 5. First, a screen displayed on the LCD 16 during an incoming call process shown in FIG. 5 is explained with reference to FIGS. 4A-4C. FIGS. 4A-4C illustrate screens displayed on the LCD 16 during the incoming call process.

FIG. 4A illustrates the reception screen 51 displayed on the LCD 16 when an incoming call is received. As shown in FIG. 4A, the display area of the LCD 16 is divided into tow parts. On the left part of the LCD 16, a display area 51a for displaying an photogram (an image) is provided.

As described in detail later, when a request for communication is received, one photograph is selected in accordance with a predetermined rule through the incoming call process shown in FIG. 5. In this case, if the party who requested the communication is one of registered persons stored in the telephone book memory 14b, an area 51b corresponding to the person who requested the communication is highlighted, for example, by blinking so that the area 51b is distinguished from other areas 51c.

As described above, the area 51b corresponding to the party who requested the communication is highlighted to be distinguishable from other areas 51c associated with the personal information PD of other persons. Therefore, the user is able to easily identify the party who requested the communication.

On a rightward area 51d of the reception screen 51 of the LCD 16, a message 51e "Receiving Incoming Call" and a speaker phone button 51f instructing closing of the phone line are displayed when the request for communication is received. In this case, if the party who requested the communication is one of registered persons, the personal information PD of the party who requested the communication is displayed on the rightward area 51d. If the user touches the speaker phone button 51f on the rightward area 51d, the MFP 1 closes the phone line and the communication with the party becomes possible.

Therefore, according to the embodiment, a photograph and the personal information PD each of which contains the party who requested the communication are displayed simultaneously on the LCD 16. Therefore, the user is able to obtain direct information concerning the party who requested the communication and indirect information (e.g., the relationship between persons including the party) concerning the party who requested the communication from the displayed photograph. Such a configuration enables the user to easily recognize the party who requested the communication.

As shown in FIG. 4A, a name P2, a phone number P3 and a residential address P4 are displayed as the personal information PD on the rightward area 51*d* of the reception screen 51. That is, in the reception screen 51, additional information such as a residential address P4 is displayed in addition to the name P2 and phone number P3. Therefore, the user is able to easily conceive the party who requested the communication If a plurality of photographs each of which contains the party who requested the communication are stored in the MFP 1, a plurality of tabs each of which describes a name of each photograph containing the party who requested the communication are displayed. Therefore, the user is able to change the photograph to be displayed on the display area 51*a* by touching one of the tags. Such a configuration enables the user to appropriately recognize the party who requested the communication, and to start the communication with the party by touching the tabs 51*g* to switch the photographs to be displayed on the display area 51*a*.

Each of FIGS. 4B and 4C illustrates the unattended time incoming history screen 52 which represents a status of histories of incoming calls during an unattended time of the user. More specifically, FIG. 4B illustrates the unattended time incoming history screen 52 generated when the number of incoming calls during the unattended time is one. On the other hand, FIG. 4C illustrates the unattended time incoming history screen 52 generated when a plurality of incoming calls have been received during the unattended time.

As shown in FIGS. 4B and 4C, on the left side of the unattended time incoming history screen 52 displayed on the LCD 16, a display area 52*a* for displaying one photograph image is provided. Under the display area 52*a*, tabs 52*b* (tabs 52*c*) are provided so as to enable the user to select one of the photographs to be displayed on the display area 52*a* by touching one of the tabs 52*b* (tabs 52*c*).

As shown in FIG. 4B, if the number of received incoming calls during the unattended time is one, a name of the photograph is displayed in the tab 52*b*. On the other hand, if a plurality of incoming calls have been received during the unattended time, respective reception times are displayed in the tabs 52*c*.

As shown in FIG. 4B, if the number of incoming call histories during the unattached time (hereafter, frequently referred to as "unattended time incoming histories") is one and a plurality of photographs each of which includes the party stored as an incoming history during the unattended time are registered, a plurality of tags 62*b* respectively indicating names of the plurality of photographs are displayed. As shown in FIG. 4C, if a plurality of unattended time incoming histories have been stored, the plurality of tabs 52*c* respectively indicating reception times of the unattached time incoming histories are displayed. It should be noted that if a photograph including a plurality of persons (parties) who have been stores as the unattached time incoming histories exists, a plurality of tabs 52*c* indicating respective reception times corresponding to the persons are provided for the photograph.

The user is able to select one of the photographs to be displayed on the display area 52*a* by touching one of the tabs 52*b* (tabs 52*c*). Therefore, if a plurality of incoming call histories are stored in the unattended time incoming history data and the MFP 1 has a plurality of photographs to be displayed, or if the unattended time incoming history data contains only one incoming call but the MFP 1 has a plurality of photographs corresponding to the party of the incoming call, the user is able to display a desired photograph of the plurality of photographs on the display area 52*a* by operating the tabs 52*b* or the tabs 52*c*.

That is, since the user is able to view a relatively large image of the selected photograph enlarged within the entire display area 52*a*, the user is able to easily recognize the photograph visually. Such a configuration also enables the user to easily and quickly identify the party who requested the communication.

As described above, the user is allowed to select a desired photograph from among the plurality of photographs through the tabs 52*b* or the tabs 52*c*. Such a configuration makes it possible to easily select a desired photograph. Consequently, the usability regarding selection of photographs can be enhanced.

When a photograph is displayed in the display area 52*a* on the unattended time incoming history screen 52, an area 52*d* corresponding to the party stored in the unattended time incoming history data is highlighted, for example by blinking, to be distinguished from other areas 52*f* to which the personal information PD is assigned. Near the display area 54*d*, a reception time 52*e* is displayed.

As described above, if the unattended time incoming history data is stored in the MFP 1, the area (52*d*) corresponding to the party stored in the unattended time incoming history data is displayed in the displayed area 52*a* of the photograph such that the area (52*d*) can be distinguished from other areas 52*f* to which the personal information PD is assigned. Such a configuration makes it possible to easily identify the party stored in the unattended time incoming history data.

If a plurality of incoming calls have been stored in the unattended time incoming history data, the MFP 1 highlights not only the area 52*d* corresponding to the party stored in the unattended time incoming history data to be distinguished from other areas 52*f* to which the personal information PD is assigned, but also the areas 52*d* and 52*g* respectively corresponding to the parties stored in the unattended time incoming history data to be distinguished with respect to each other (for example, by differentiating the time intervals of blinking or blinking colors between the area 52*d* and the area 52*g*). Near the areas 52*d* and 52*g*, reception times respectively corresponding to the areas 52*d* and 52*g* are displayed.

As shown in FIG. 4C, if a plurality of incoming calls have been stored in the unattended time incoming history data, a photograph associated with the personal information PD of the party who is stored as the latest history in the unattended time incoming history data is displayed preferentially. That is, when onscreen representation is switched from the reception screen 61 to the unattended time incoming history screen 52, the photograph containing the party stored as the latest history in the unattended time incoming history data is displayed preferentially in the display area 52*a*. Such a configuration enables the user to easily recognize the latest party who requested the communication during the unattended time through the unattended time incoming history screen 52.

In other words, in one photograph, the areas (52*d* and 52*f*) respectively corresponding to the parties stored in the unattended time incoming history data are outputted such that the areas can be distinguished with respect to each other. Therefore, the user is able to recognize the existence of a plurality of received incoming calls stored in the unattended time incoming history data, and to intuitively recognize the relationship between the parties stored in the unattended time incoming history data through the one photograph displayed in the display area 52*a*.

In a rightward area 52*h* on the unattended time incoming history screen 52 displayed on the LCD 16, the personal information PD representing the party is displayed. If the unattended time incoming history data stores a plurality of incoming calls, the personal information PD of the party corresponding to the latest history in the unattended time incoming history data or the personal information PD corresponding to the photograph or an area selected by the user is displayed.

In the area 52h, a dialing button 52i for dialing the personal information PD displayed in the display area 52h is displayed. By touching the dialing button 52i in the state where the personal information PD is displayed in the area 52h, the user is able to start a call for the person corresponding to the personal information PD. That is, the user is able to start a call after properly recognizing the information concerning the party stored in the unattended time incoming history data through the photograph displayed in the display area 52a.

As shown in FIGS. 4B and 4C, the name P2, the phone number P3 and the residential address P4 are displayed as the personal information PD on the unattended time incoming history screen 52 (the area 52h). Since additional information, such as the residential address P4 is displayed in the unattended time incoming history screen 52 in addition to the name P2 and the phone number P3, the user is able to easily conceive the party stored in the unattended time incoming history data.

As described above, the photograph containing the party stored as the unattended time incoming history and the personal information are displayed simultaneously on the LCD 16. Therefore, it is possible to obtain direct information concerning the party stored in the unattended time incoming history data and to obtain indirect information concerning the party (e.g., the relationship between persons including the party) from the photograph corresponding to the party. Such a configuration enables the user to easily recognize the party stored in the unattended time incoming history data.

Hereafter, the incoming call process executed when a request for communication is received is explained with reference to FIG. 5. FIG. 5 is a flowchart illustrating the incoming call process executed under control of the CPU 11 of the MFP 1. The incoming call process is started when a request for communication is received.

First, the CPU 11 checks whether the unattended time incoming history data is stored in the unattended time incoming history memory 14d (step S11).

If the unattended time incoming history data has been stored in the unattended time incoming history memory 14d (S11: YES), the CPU 11 judges whether a photograph containing a party who requested the communication and other persons also stored in the unattended time incoming history memory 14d has been stored in the telephone book memory 14b (the image information memory 14b2) (step S12).

If a photograph containing a party who requested the communication and other persons also stored in the unattended time incoming history memory 14d has been stored in the telephone book memory 14b (S12: YES), the CPU 11 displays the reception screen 51 using the photograph containing a party who requested the communication and other persons also stored in the unattended time incoming history memory 14d (step S13). In this case, the photograph is displayed such that an area associated with the party is distinguished from other areas, for example, by blinking the area associated with the party (see FIG. 4A).

If no history has been stored in the unattended time incoming history memory 14d (S11: NO) or a photograph containing a party who requested the communication and other persons also stored in the unattended time incoming history memory 14d has not been stored in the telephone book memory 14b (S12: NO), control proceeds to step S17. In step S17, the CPU 11 judges whether the call history data for the party who requested the communication has been stored in the call history memory 14c.

If the call history data for the party who requested the communication has been stored in the call history memory 14c (S17: YES), the CPU 11 selects a photograph which has been used at the latest transmission of a call, from among call histories stored in the call history memory 14c, generates the reception screen 51 using the selected photograph and displays the reception screen 51 (step S18). At this time, the CPU 11 blinks the area associated with the party to distinguish the area associated with the party from other parts (see FIG. 4A).

If no call history for the party who requested the communication has been stored in the call history memory 14c (S17: NO), the CPU 11 judges whether the MFP 1 has a plurality of photographs each of which is associated with the party who requested the communication have been stored in the telephone book memory 14b (the image information memory 14b2) (step S19).

If a plurality of photographs each of which is associated with the party who requested the communication have been stored in the telephone book memory 14b (S19: YES), the CPU 11 judges whether the plurality of photographs associated with the party include group photographs (step S20). The term "group photograph" means a photograph in which a plurality of persons are shot.

If group photographs are included in the plurality of photographs associated with the party (S20: YES), the CPU 11 generates the reception screen 51 using one of the group photographs stored firstly in the telephone book memory 14b, and displays the reception screen 51 on the LCD 16 (step S21). In this case, the CPU 11 displays the group photograph such that the area corresponding to the party is distinguished from other parts as shown in FIG. 4A.

If no group photograph is found (S20; NO), the CPU 11 generates the reception screen 51 using the photograph stored firstly in the telephone book memory 14b, and displays the reception screen 51 on the LCD 16 (step S23). In this case, the CPU 11 displays the photograph such that the area corresponding to the party is distinguished from other parts as shown in FIG. 4A.

If a plurality of photographs each of which is associated with the party who requested the communication have not been stored in the telephone book memory 14b (S19: NO), the CPU 11 judges whether a photograph associated with the party who requested the communication has been stored in the telephone book memory 14b (step S22).

If a photograph associated with the party who requested the communication has been stored in the telephone book memory 14b (S22: YES), the CPU 11 generates the reception screen 51 using the one photograph which has been stored firstly in the telephone book memory 14b (step S23). In this case, to distinguish the area associated with the party from other parts, the CPU 11 blinks the area associated with the party in the reception screen 51 (see FIG. 4A).

If no photograph associated with the party who requested the communication has been stored in the telephone book memory 14b (S22: NO), the CPU 11 generates the reception screen 51 using a predetermined image not relating to the party (e.g., an image in which a shape of a person and a message "NO DATA" are depicted), and displays the reception screen 51 on the LCD 16 (step S24).

After step S13, S18, S21, S23 or S24 are processed, the CPU 11 starts to generate a calling sound (step S14). Then, the CPU 11 judges whether the speaker phone button 51f has been touched (step S15). If the speakerphone button 51f has been touched (S15:YES), the CPU 11 closes the phone line so that the communication becomes possible (step S16). Then, the incoming call process terminates.

If the speakerphone button 51f has not been touched (S15: NO), the CPU 11 judges whether the call from the party is finished (step S25).

If the call from the party is continuing (S25: NO), control returns to step S15. If the call from the party is finished (S25: YES), the CPU 11 stores the time when the call is received and the phone number of the party (i.e., information concerning the party) in the unattended time incoming history memory 14d as an incoming history during the unattended time (step S26).

After step S26 is processed, the CPU 11 displays the unattended time incoming history screen 52 on the LCD 16 in place of the reception screen 51 (step S27). Then, the incoming call process terminates. It should be noted that when the unattended time incoming history screen 52 is displayed on the LCD 16 in step S27, an image to be firstly displayed in the display area 52a is selected in the same manner as that shown in steps S11-S13 and S17-S21.

Therefore, according to the above described incoming call process, when a request for communication is received, a photograph selected in accordance with a predetermined rule (steps S11-S13 and S17-S21) is displayed in the display area 51a of the reception screen 51. On the other hand, if a request for communication is received but the requested is finished without starting communication for the request, a photograph selected in accordance with the same rule is displayed in the display area 52a of the unattended time incoming history screen 52. Therefore, the user is able to easily obtain additional information concerning the party who requested communication by visually checking the entire photograph displayed in the display areas 51a and 52a.

As described above, a photograph to be displayed preferentially is determined in accordance with the predetermined rule both in the case where the process for a request for communication is started and in the case where a request for communication is finished without starting communication for the request.

According to the predetermined rule, if persons other than a party currently being processed (or the latest party who requested communication) exist in the unattended time incoming history data, the MFP 1 places the first priority on displaying a photograph in which the party currently being processed (or the latest party who requested communication) is shot with other persons stored in the unattended time incoming history data.

That is, a photograph including a plurality of pieces of personal information including the latest party who requested communication is displayed preferentially. Therefore, from one photograph, the user is able to recognize a plurality of requests for communication (including past requests for communication stored as unattended time incoming history) from a plurality of persons.

As described above, the CPU 11 places the second highest priority on displaying a photograph which is selected from among the call history data for the party currently being processed and has been used at the time of the latest execution of a call. That is, the photograph stored in the call history data is selected and displayed. Such a configuration enables the user to recognize the party who requested communication (including a person stored in the unattended time incoming history data) based on the user's own memory concerning past execution of requests for communication.

In particular, since the photograph used for the latest execution of a call is selected from the call history data, the user is able to easily recall the party who requested communication (including a person stored in the unattended time incoming history data).

As described above, the CPU 11 places the third priority on displaying a group photograph including a party currently being processed. Since the group photograph including the part is displayed, the user is able to obtain indirect information, such as relationship between persons including the party, by visually checking the group photograph. That is, the user is able to obtain a large amount of information concerning the party who requested communication (including a person stored in the unattended time incoming history).

As described above, a photograph which has been firstly registered in the telephone book memory 14b, i.e., a photograph which has been associated with the personal information when the personal information has been firstly stored in the personal information memory 14b1, is used preferentially. Such a configuration enables the user to easily recognize a correspondence between the personal information PD and the photograph, and to easily recognize the party who requested the communication (including a person stored in the unattended time incoming history data).

Hereafter, a calling process for making a call for a party using a telephone book stored in the telephone book memory 14b is explained with reference to FIGS. 6A-6D and 7. FIGS. 6A-6D illustrate examples of calling screens 53 displayed on the LCD 16 during execution of the calling process.

FIG. 6A illustrates the calling screen 53 used to select a photograph including desired personal information PD. As shown in FIG. 6A, the calling screen 53 is divided into two areas including a leftward display area 53a in which a photograph can be displayed. Under the display area 53a, tabs 53 for selecting a desired photograph to be displayed in the display area 53a are displayed. In this state, the user is allowed to select a photograph including a desired destination by touching a corresponding tag 53b, for example, with the user's finger. In the display area 53a, the photograph selected by the user is displayed.

FIG. 6B illustrates a state where the user has touched a desired area, to which the desired personal information (i.e., desired destination) is related, on the photograph being displayed in the display area 53a. When the area (the area 53c in FIG. 6B) to which the desired personal information is related is touched by the user, the CPU 11 highlights the touched area (53c) by blinking so that the touched area can be distinguished from other areas.

When the area 53c to which the personal information PD is related is touched by the user, the personal information PD associated with a person corresponding to the touched area 53a is displayed in a rightward display area 53d in the calling screen 53. A dialing button 53 for dialing a phone number corresponding to the personal information displayed in the display area 53d is also displayed in the display area 53d.

FIG. 6C is the calling screen 53 illustrating a situation where the person corresponding to the personal information PD displayed in the display area 53d (i.e., the person associated with the display area 53c on the photograph) has been determined as a party for communication and the user starts dialing. As shown in FIG. 6C, the user is able to start a call for the party by touching a dialing button 53e.

FIG. 6D is the calling screen 53 illustrating a situation where the user touches a person image 53f displayed in an area 53d in a mode where the MFP 1 extracts a photograph corresponding to the personal information based on the personal information. As shown in FIG. 6D, on the right side of the LCD 16, the person image 53f corresponding to a cutout from the area 53c is displayed.

In the mode where the MFP 1 extracts a photograph corresponding to the personal information based on the personal information, the user is able to instruct the MFP 1 to extract a photograph associated with the person image 53*f* (i.e., the personal information PD displayed in the area 53*d*) by touching the person image displayed in the area 53*d*. Furthermore, the user is able to select and display one of extracted photographs by touching one of tags 53*b*.

Figure 7:
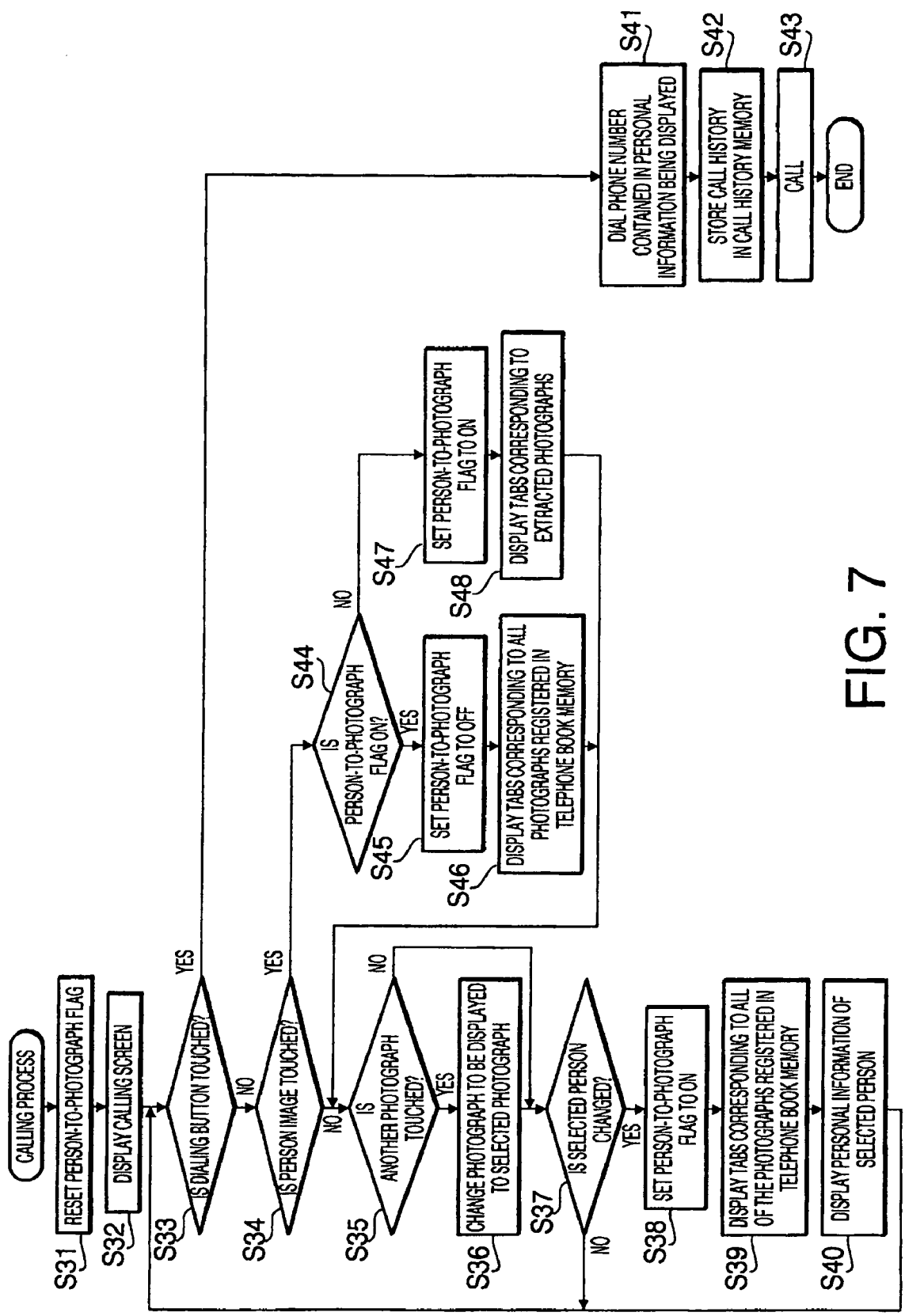
FIG. 7 is a flowchart illustrating the calling process.

Hereafter, the calling process for calling a desired destination based on the telephone book is explained with reference to FIG. 7. FIG. 7 is a flowchart illustrating the calling process executed under control of the CPU 11 of the MFP 1. The calling process starts when the user inputs a command for selecting a telephone mode.

When the calling process is started, the CPU resets the person-to-photograph flag 14*c* (step S31). Then, the CPU 11 displays the calling screen 53 shown in FIG. 6A (step S32). In this case, in the display area 53*a*, one of photographs registered in the telephone book memory 14*b* is displayed. Further, tabs 53*d* respectively corresponding to all of the photographs registered in the telephone book memory 14*b* are displayed.

After step S32 is processed, the CPU 11 judges whether the dialing button 53*e* in the calling screen is touched (step S33). If the dialing button 53*e* is not touched (S33: NO), the CPU 111 judges whether the person image 53*f* displayed in the area 53*d* is touched (step S34). If the person image 53*f* is not touched (S34: NO), control proceeds to step S35.

If the person image 53*f* is touched (S34: YES), the CPU 11 judges whether the person-to-photograph flag 14*e* is ON (step S44). If the person-to-photograph flag 14*e* is OFF (S44: NO), the CPU 11 sets the person-to-photograph flag 14*e* to ON (step S47). In this case, the MFP 1 moves from a mode where the MFP 1 extracts personal information from a photograph to a mode where the MFP 1 extracts photographs from personal information based on the personal information.

After step S47 is processed, the CPU 11 extracts all the photographs associated with the touched person image 53*f* (i.e., the personal information PD displayed in the area 53*d*), and displays the tabs 53*b* corresponding to the extracted photographs (step S48). Then control proceeds to step S35.

As a result of step S48, the user is able to display all of the photographs each of which includes the person image 53*f* by the user operation of touching one of the tags 53*b*.

If the person-to-photograph flag is ON (S44: YES), the CPU 11 sets the person-to-photograph flag 14*e* to OFF (step S45). As a result, the MFP 1 moves from the mode where the MFP 1 extracts photographs from personal information based on the personal information to the mode where the MFP 1 extracts personal information from a photograph. That is, each time the person image 53*f* displayed in the area 53*d* is touched, the MFP 1 switches between the mode where the MFP 1 extracts photographs from personal information based on the personal information to the mode where the MFP 1 extracts personal information from a photograph.

After step S45 is processed, the CPU 11 displays the tabs 53*b* corresponding to all the photographs registered in the telephone book memory 14*b* (step S46). Then, control proceeds to step S35. Therefore, in the mode where the personal information is extracted from a photograph, the user is allowed to instruct the MFP 1 to extract the personal information PD from among all of the photographs registered in the telephone book memory 14*b*.

In step S35, the CPU 11 judges whether another photograph (which is different from the photograph being displayed in the display area 53*a*) is selected. That is, the CPU 11 judges whether the tab 53 of a photograph different from the photograph being displayed in the display area 53*a* is selected.

If the photograph to be displayed is changed by the user (S35: YES), the CPU 11 displays the newly selected photograph in the display area 43*a* in place of the previously displayed photograph (step S36). Then, control proceeds to step S37. If the photograph to be displayed is not changed (S35: NO), control directly proceeds to step S37.

In step S37, the CPU 11 judges whether the selected person is changed (i.e., whether another area in the photograph being displayed is selected). If another area in the photograph being displayed is selected to change the selected person (S37: YES), the CPU 11 turns the person-to-photograph flag 14*e* to OFF (step S38).

After step S38 is processed, the CPU 11 displays the tabs 53*b* corresponding to all of the photographs registered in the telephone book memory 14*b* (step S39). Then, the CPU 11 reads the personal information PD corresponding to the selected person (i.e., the personal information PD associated with the selected area) from the telephone book memory 14*b* (i.e., the personal information memory 14*b*1 and the image information memory 14*b*2), and displays the personal information in the area 53*d* (step S40). Then, control returns to step S33.

If the selected person is not changed (i.e., another area in the photograph being displayed is not touched (S37: NO), control returns to step S33.

If the CPU 11 judges in step S33 that the dialing button 53*e* is touched (S33: YES), the CPU 11 dials the phone number P3 contained in the personal information PD being displayed in the area 53*d* (i.e., the personal information PD associated with the area 53D selected by the user) (step S41). After step S41 is processed, the CPU 11 stores, as call history data, the calling time, the telephone number which is information representing the party for communication, and information representing the photograph being displayed in the display area 53*a* in the call history memory 14*c* (step S42), and starts a call (step S43). Then, the calling process terminates.

As described above, in the calling process, the user is able to determine the party for communication while visually checking the photographs being displayed on the LCD 16 (i.e., the photograph being displayed in the display area 53*a* in the calling screen 53). That is, the user is able to designate a party for communication based on the photograph displayed on the LCD 16. Such a configuration enables the user to select a person (i.e., a party for communication) who is conceived from the photograph being displayed, and to start a call after properly recognizing the information concerning the party for communication.

The calling process shown in FIG. 7 may be started when the user inputs a command for selecting a facsimile transmission mode (i.e., the facsimile function).

As described above, according to the embodiment, when a photograph with which not only the personal information PD representing the party sending the request but also the personal information PD of another person are associated is displayed in the reception screen 51 during the state of receiving a request for communication, the area corresponding to the party sending the request is displayed such that the area corresponding to the party sending the request is distinguished from other areas corresponding to other personal information PD. Such a configuration enables the user to easily identify the party sending the request. Consequently, the usability of the MFP 1 is enhanced.

When a photograph with which not only the personal information PD representing the party sending the request but also the personal information PD of another person is associated is displayed in the unattended time incoming history screen 52, the MFP 1 displays the unattended time incoming history screen 52 such that the area corresponding to the party sending the request is distinguished from other areas corresponding to other personal information PD. Therefore, the user is able to easily identify the party sending the request. Consequently, the usability of the MFP 1 is enhanced.

By visually checking the reception screen 51 or the unattended time incoming history screen 52 and comparing the area corresponding to the party sending the request with another area associated with another personal information PD, the user is able to obtain indirect information concerning the party who requested the communication.

As described above, the user is allowed to select one of photographs by simply touching the tabs (51f, 52b, 52c or 53b). That is, the user is able to select a desired photograph by a simple operation.

Second Embodiment

Figure 8:
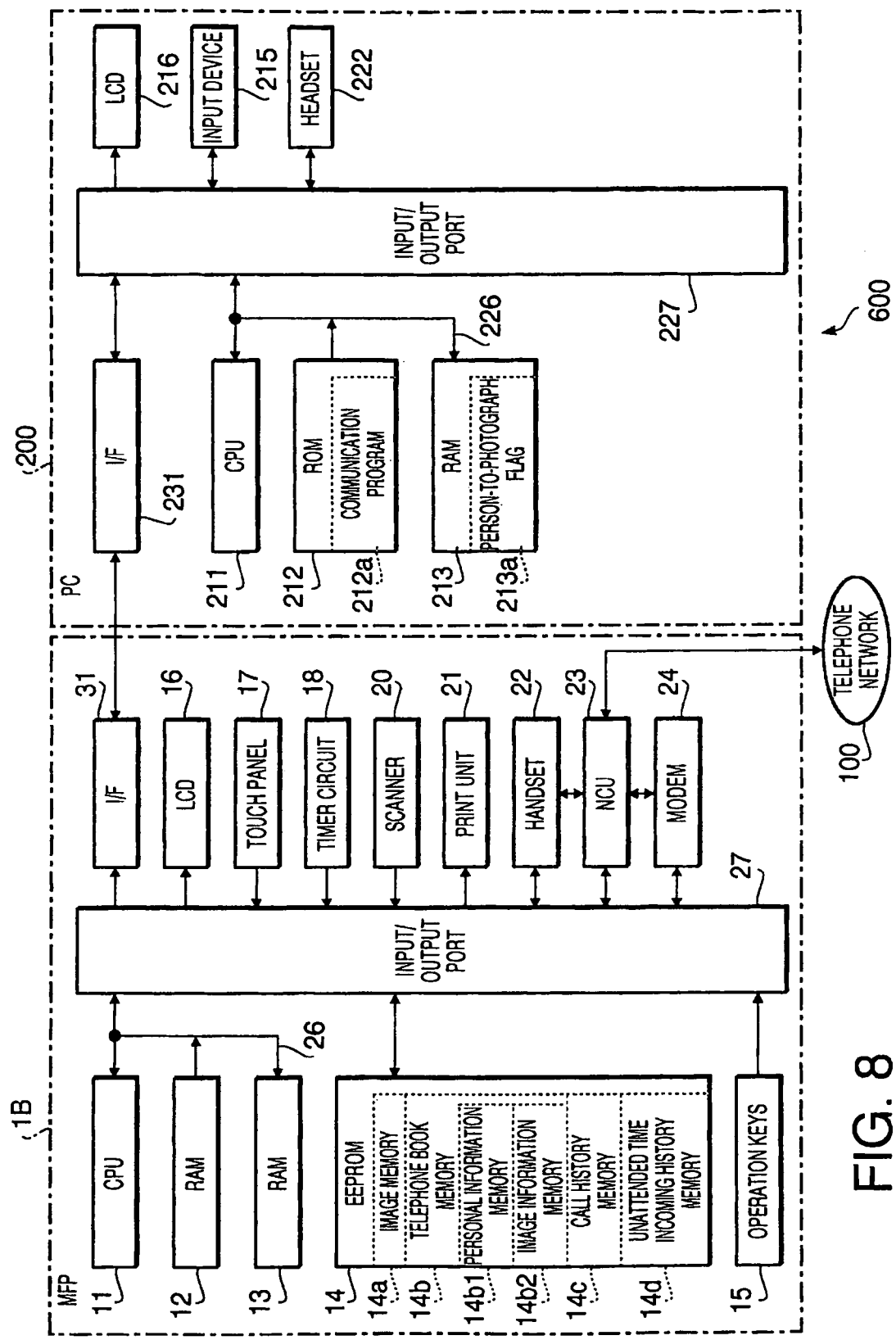
FIG. 8 is a block diagram of a communication system according to a second embodiment.

Hereafter, a communication system 500 according to a second embodiment is described. FIG. 8 is a block diagram of the communication system 500. As shown in FIG. 8, the communication system 500 includes an MFP 1B and a PC (personal computer) 200.

In the first embodiment, the MFP 1 executes the communication through the telephone network 100 in response to the user operation conducted on the MFP 1. By contrast, in the second embodiment, the MFP 1B executes the communication through the telephone network 100 in response to a user operation conducted on the PC 200.

That is, a basic configuration of the MFP 1B according to the second embodiment is substantially the same as that of the MFP 1 according to the first embodiment. Therefore, in FIG. 8, to elements which are substantially the same as those of the first embodiment, the same reference numbers are assigned, and explanations thereof will not be repeated. In the following, the explanation focuses on features of the MFP 1B and the PC 200.

As shown in FIG. 8, the MFP 1B and the PC 200 are communicatably connected to each other via an interface (I/F) 31 provided in the MFP 1B and an interface (I/F) 231 provided in the PC 200.

The difference between the MFP 1B and the MFP 1 is that the MFP 1B does not have the communication program 12a and the person-to-photograph flag 14e.

The PC 200 includes a CPU 21, a ROM 212, a RAM 213, an input unit 215, an LCD 216, and a headset 222 which is a headphone integrally provided with a microphone. The CPU 211, the ROM 212 and the RAM 213 are connected to each other via a bus line 226. The input unit 215, the LCD 216, the headset 222 and the bus line 226 are connected to each other via an input/output port 227.

The CPU 211 controls functions of the PC 200 and the components connected to each other via the input/output port 227, in accordance with programs and fixed values stored in the ROM 212 or the RAM 213 and various signals transmitted or received via the NCU 223.

The ROM 212 stores the control program to be executed by the CPU 211 and fixed values to be used to executed the control program. As shown in FIG. 8, the ROM 212 has an area for storing a communication program 212a. By executing the communication program 212a, a process corresponding to the incoming call process shown in FIG. 5 and a process corresponding to the calling process shown in FIG. 7 are executed.

The RAM 213 is used to temporarily store various types of data during execution of the functions of the PC 200. As shown in FIG. 8, the RAM 213 has a person-to-photograph flag 213a. The person-to-photograph flag 213a has the same function as the person-to-photograph flag 14e described in the first embodiment. That is, the person-to-photograph flag 213a is used to judge whether the MFP 1B is in the mode where photographs corresponding to the personal information are extracted based on the personal information during execution of a process corresponding to the incoming call process shown in FIG. 5.

The input unit 215 functions as a device for inputting various types of information or commands to the PC 200. The input unit 215 may be formed as a touch panel integrally formed with the LCD 216.

As described above, in the second embodiment, the process corresponding to the incoming call process shown in FIG. 5 and the process corresponding to the calling process shown in FIG. 7 are executed on the PC 200. More specifically, in the processes corresponding to the incoming call process and the calling process, the screens 51, 52 and 53 are displayed on the LCD 216 of the PC 200. The user conducts user operations through the screens 51, 52 and 53 by operating the input unit 215 in place of touching the screens 51, 52 and 53. The photographs to be displayed on the screens 51, 52 and 53 are read from the image memory 14a in accordance with contents in the telephone book memory 14b.

As described above, in the communication system 500 according to the second embodiment, when a photograph with which not only the personal information PD representing the party who requested the communication but also another personal information corresponding to another person is associated is displayed on the LCD 216, the screen is displayed such that the area corresponding to the party who requested the communication is distinguished from another personal information PD. Such a configuration enables the user to easily identify the party who requested the communication. Therefore, the same advantages as those of the first embodiment can also be achieved by the second embodiment.

Hereafter, variations of the above described embodiments are explained.

Figure 9:
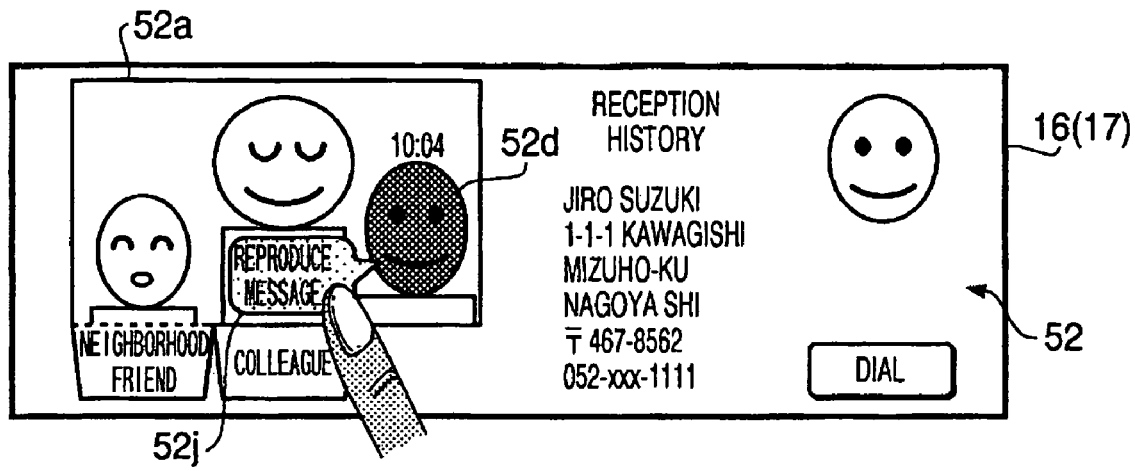
FIG. 9 illustrates an example of an unattended time incoming history screen to be displayed on the when a message from a party who requested communication has been stored in an unattended time incoming history memory.

For example, the unattended time incoming history memory 14d may be configured to store a message from the party who requested the communication. In this case, as shown in FIG. 9, a message indicating that the message from the party who requested the communication has been stored may be displayed in the unattended time incoming history screen 52. FIG. 9 is an example of the unattended time incoming history screen 52 to be displayed on the LCD 16 when a message from the party who requested the communication has been stored in the unattended time incoming history memory 14d.

As shown in FIG. 9, in order to display a photograph corresponding to the party who left the message in the display area 52a of the unattended time incoming history screen 52, the CPU 211 displays a balloon 52j drawn from the area 52d corresponding to the party who requested communication. By visually checking the balloon 52j, the user is able to know that a message from the party corresponding to the area 52d has been recorded.

The MFP 1B may be configured such that, when the user touches the balloon 52j, the MFP 1B reproduces the message left by the party who requested the communication. In this case, since the message is reproduced by touching the balloon 52j, the user is able to start the reproduction of the message by an intuitive operation.

In the above described incoming call process shown in FIG. 5, both in the case where the request for communication is accepted and in the case where the request for communication is finished without being accepted, priority for displaying photographs is determined in accordance with the predetermined rule. However, the priority for displaying photographs is not limited to the examples described in the embodiments (e.g., conditions or processing order described in the incoming call process). Various types of conditions may be adopted for determining priority for displaying photographs.

Figure 10:
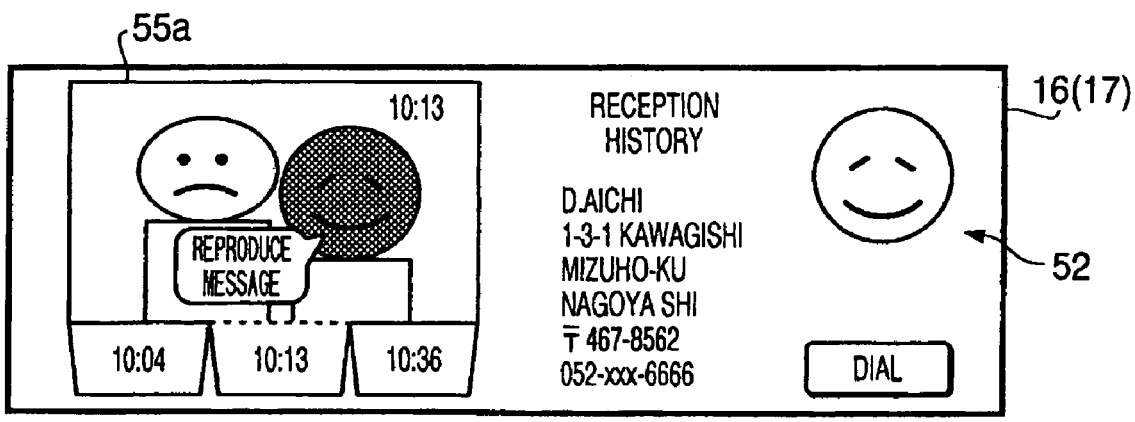
FIG. 10 illustrates another example of an unattended time incoming history screen.

If the MFP is configured to record a message from the party who requested communication, the MFP may display preferentially a photograph including the party who left the message (see FIG. 10). By thus displaying preferentially a photograph including the party who left the message, the user is able to reliably know that the message has been left in the MFP. That is, it is possible to prevent the user from failing to listen to the message.

In the above described embodiment, the area corresponding to the party for communication is highlighted so that the area can be distinguished from other areas on the reception screen 51, the unattended time incoming history screen 52 and the calling screen 53. In this case, the area corresponding to the party who requested the communication is highlighted by blinking the area or coloring the area.

When a photograph including the party who requested the communication and other persons who are stored in the unattended time incoming history memory 14s is displayed on the reception screen, the MFP may display the area associated with the party who requested the communication and the area associated with another person stored in the unattended time incoming history data such that these areas can be distinguished from each other. With this configuration, by comparing the area associated with the party who requested the communication and the area associated with another person stored as an unattended time incoming history, the amount of information concerning the party who requested the communication increases. In addition, the MFP enables the user to deepen the understanding of the party.

In the above described embodiments, the screen of the LCD 16 is divided into the two parts including the leftward display area (e.g., the display area 51a) and the right ward area displaying the personal information PD (e.g., the area 51d). However, the number of divided areas of the LCD 16 is not limited to the example show in the above described embodiments. For example, the display area of the LCD 16 may be divided into more than two areas. In such a case, the amount of information to be displayed simultaneously on the LCD 16 can be increased. Such a configuration also makes it possible to deeply recognize the party who requested the communication.

In the above described embodiment, by touching an area in a photograph displayed on the LCD 16 which is integrally formed with the touch panel 17, the user designates an area defined in the photograph. However, the MFP may be configured to allow the user to select an area defined in a photograph by pointing to an image displayed on the LCD 16 with a cursor or a pointer which moves in response to a user operation conducted through the operation keys 15.

In the above described embodiment, the MFP enables the user to visually check a plurality of photographs associated with the personal information PD corresponding to one person. However, it is also possible to allow the user to visually check the personal information PD common to a plurality of photographs by associating the common personal information PD with a plurality of photographs. By thus configuring the MFP to refer to the personal information PD common to a plurality of photographs, the user is able to obtain additional information which can not be obtained from a single photograph.

In the above described embodiment, the personal information PD (i.e., information concerning a person) is associated with a photograph. However, various types of information, such as information concerning a device, an object or a natural object shot in a photograph, may be associated with the photograph.

An object with which the personal information PD is associated is not limited to a photograph. For example, the personal information may be associated with a picture or a graphics of a character.

In the above described embodiment, a person (a face of a person) is defined as a area with which the personal information PD is associated. However, various types of parts in a photograph may be defined as areas with which the personal information is associated.

In the above described embodiment, the personal information PD and an area are associated with each other in a one-to-one relationship. However, an area may be associated with a plurality of pieces of personal information. For example, if a house is shot in a photograph, the house may be defined as an area. In this case, a plurality of pieces of personal information corresponding to family members may be associated with the house shot in the photograph.

In the above described embodiment, the telephone book memory 14 includes the personal information memory 14b1 and the image information memory 14b2, the personal information memory 14b1 stores the personal information PD, and the image information memory 14b2 stores the image name Q1 and the person number P1 corresponding to the personal information PD stored in the personal information memory 14b1. Such a data structure makes is possible to prevent the memory area of the EEPROM 14 to be wastefully consumed even if the same personal information is associated with a plurality of pieces of image data.

However, a data structure of the telephone book memory 14 may be configured as shown in FIGS. 11A and 11B.

As shown in FIGS. 11A and 11B, a telephone book memory 140b is configured such that, for each of a plurality of pieces of image data each of which is specified by an image name R1, area information R2, personal information PD including a name R3, a phone number R4 or a residential address (not shown), and a person number R5 are stored.

When personal information PD is firstly associated with a photograph, the personal information PD is stored in a data area associated with image data specified by the image name R1 "neighborhood friend" in the telephone book memory 140 as shown at the line L1 in FIG. 11A.

On the other hand, if personal information PD has been already associated with another photograph, the personal information PD is not stored in a data area associated with image data specified by the image name R1 "colleagues" as shown at the line L2 in FIG. 11B. In this case, the personal information PD stored in the data area associated with the image data specified by the image name R1 "neighborhood friend" can be referred to via the person number "A1".

Therefore, in the case where the data structure shown in FIGS. 11A and 11B is adopted, it is also possible to prevent the memory area of the EEPROM 14 from being consumed wastefully even if a plurality of pieces of image data are associated with the same personal information.

In the above described embodiment, the personal information PD and the area information Q2 are stored separately from the image data stored in the image data memory 14a. However, the personal information PD and the area information Q2 may be stored in a header part of image data. In this case, if the same personal information is associated with a plurality of pieces of image data, the data structure may be configured such that the personal information PD associated with another image data can be referred to through identification information, such as the person number P1.

In the above described incoming call process shown in FIG. 5, if a plurality of photographs associated with the party who requested communication are stored (S19: YES), the MFP checks whether a group photograph is included in the plurality of photographs in step S20. However, the MFP may be configured such that if a plurality of photographs associated with a party who requested communication are stored (S19: YES), the MFP displays, on the reception screen 51, a photograph which has been stored firstly in the telephone book memory 14b regardless of whether the photograph which has been stored firstly in the telephone book memory 14b is a group photograph or a non-group photograph, by omitting step S20.

In the above described second embodiment, the image memory 14a, the telephone book memory 14b (i.e., the personal information memory 14b1 and the image information memory 14b2) and the call history memory 14c, and the unattended time incoming history memory 14d are provided in the MFP 1B. However, part or all of these memories 14a, 14b, 14c and 14d may be provided in the RAM 213 of the PC 200.

Third Embodiment

Figure 12:
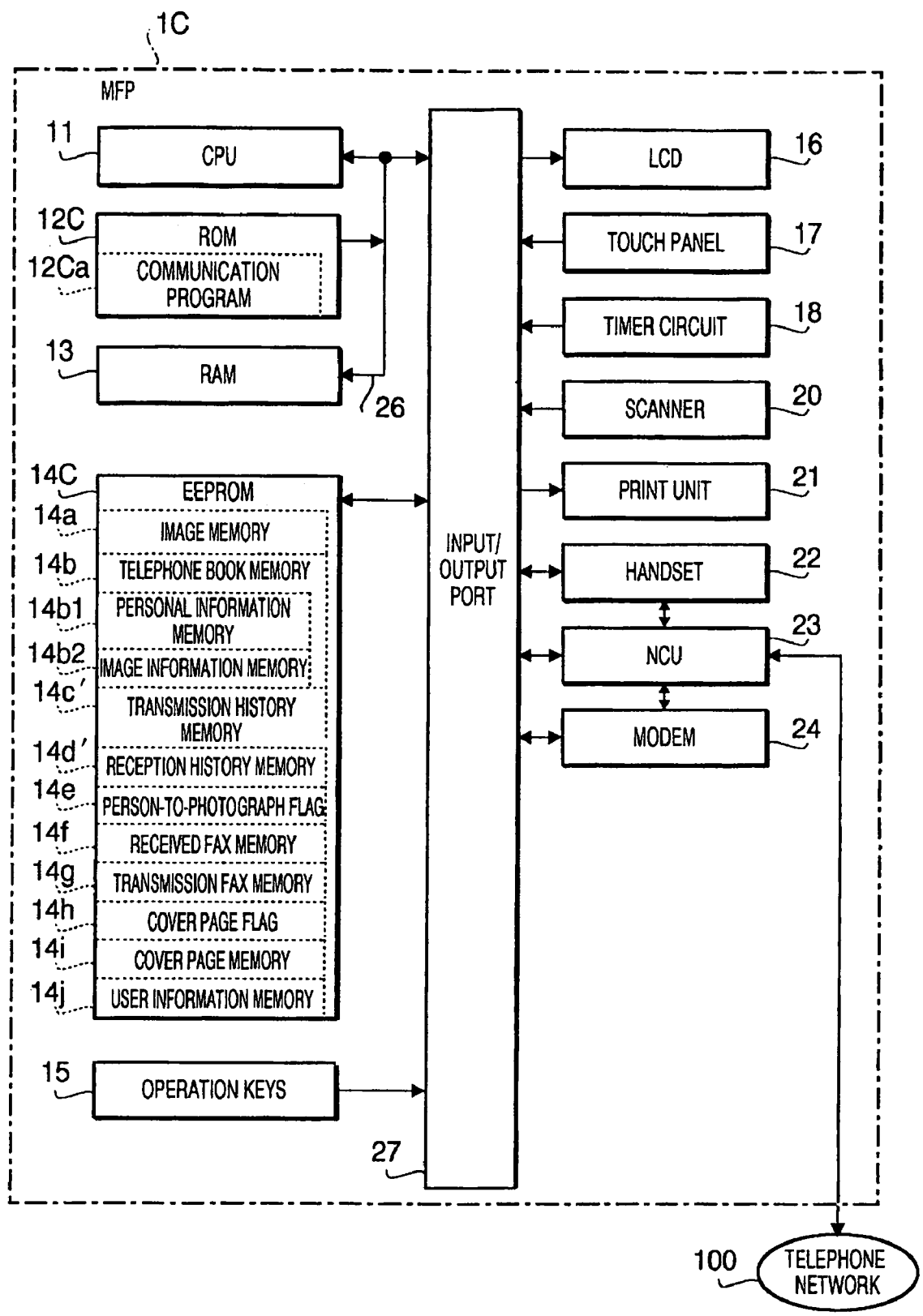
FIG. 12 is a block diagram illustrating a control system of an MFP according to a third embodiment.

Hereafter, an MFP (Multi-Function Peripheral) 1C according to a third embodiment is described. FIG. 12 is a block diagram of the MFP 1C according to the third embodiment. As shown in FIG. 12, the MFP 1C has a configuration which is substantially the same as those of the first embodiment. Therefore, in FIG. 12, to elements which are substantially the same as those of the first embodiment, the same reference numbers are assigned, and explanations thereof will not be repeated. In the following, the explanation focuses on the feature of the third embodiment.

As described in detail below, the MFP 1C is configured to enable the user to easily recognize a party on the other side (e.g., a source of facsimile data or a destination of facsimile transmission).

When the user uses the telephone function or the facsimile function of the MFP 1C, various types of information is displayed depending on the type of the function being executed. For example, when the facsimile function is executed, a reception screen 51C (see FIG. 13A), a reception history screen 52C (see FIG. 13B or 13C), a received FAX display screen 55 (see FIG. 13D), a transmission screen 53C (see FIG. 16A), a FAX transfer mode screen 56 (see FIG. 18A), and a page designation screen 57 (see FIG. 18B) used for facsimile data for transferring are displayed.

As described in detail later, when the MFP 1C displays a screen concerning facsimile transmission or reception (e.g., the reception screen 51C or the transmission screen 53C), the MFP 1C displays personal information concerning a person stored in advance in the telephone book memory 14b and an image in which the person is included. The data structure of the telephone book 14b is shown in FIGS. 3A-3C of the first embodiment.

A ROM 12C stores control programs to be executed by the CPU 11 and fixed data used for execution of the control programs. The ROM 12C stores a communication program 12Ca for controlling the MFP 1C to function as a device allowing the user to easily recognize a source of received data and a destination of transmission data. By executing the communication program 12Ca, processes shown in FIGS. 14, 15, 17 and 20 are executed on the MFP 1C.

The RAM 13 is used as a work memory for storing temporarily data during execution of the functions of the MFP 1C.

An EEPROM 14C includes the image memory 14a, the telephone book memory 14b, the personal information memory 14b1, the image information memory 14b2, a transmission history memory 14c', a reception history memory 14d', the person-to-photograph memory 14e, a received FAX memory 14f, a transmission FAX memory 14g, a cover page flag 14h, a cover page memory 14i and a user information memory 14j.

The transmission history memory 14c' is a memory area in which a transmission time, information representing a destination of the facsimile transmission (e.g., a facsimile number), a photograph displayed on the display area 53 of the transmission screen 53C displayed at the time of transmitting facsimile data are stored when the facsimile transmission is executed on the MFP 1C. Hereafter, history stored in the transmission history memory 14c' is frequently referred to as "transmission history data".

The reception history memory 14d' is a memory area in which a reception time, information representing a source of facsimile data (e.g., a facsimile number), information representing a location of received data in the received Fax memory 14f are stored as history data. Hereafter, history data stored in the reception history memory 14d' is frequently referred to as "reception history data". It should be noted that history stored in the reception history memory 14d is deleted when corresponding received data is deleted from the received FAX memory 14f.

Figure 17:
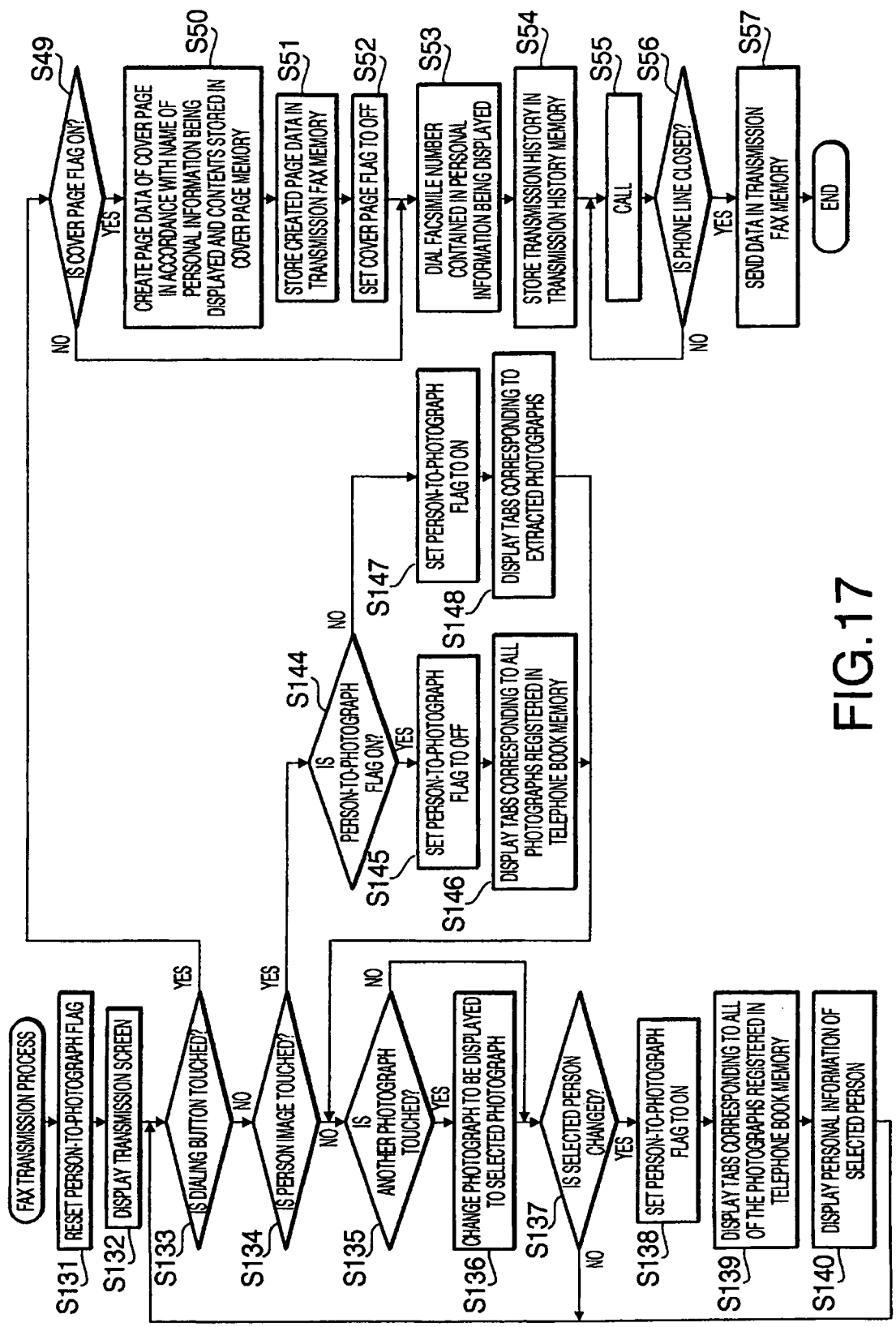
FIG. 17 is a flowchart illustrating the FAX transmission process executed by the MFP.

The person-to-photograph flag 14e is a flag indicting whether the MFP 1C is in a mode where the MFP 1C extracts a photograph corresponding to personal information in a FAX transmission process shown in FIG. 17. The person-to-photograph flag 14e being in an ON state indicates that the MFP 1C is in a mode where a photograph corresponding to personal information is extracted based on the personal information. The person-to-photograph flag 14e being in an OFF state indicates that the MFP 1C is in a mode where personal information is extracted from a photograph.

The received FAX memory 14f is a memory area in which FAX data is stored when the MFP 1C receives the FAX data from an external device. The FAX data stored in the received FAX memory 14f is deleted when a deletion button 55c is touched in a state when the received FAX display screen 55 is displayed.

The transmission FAX memory 14g is a memory area in which FAX data (page data) transmitted to an external device (e.g., a party for communication, a destination of transmission or a destination of transfer) is stored. The FAX data to be transmitted to an external device is obtained, for example, by reading a document through the scanner 20 or by reading data from a memory medium (e.g. a compact flash or a SD card) inserted into a slot (not shown) of the MFP 1C, and is stored in the transmission FAX memory 14g.

As described in detail later, the MFP 1C is configured to transfer received FAX data to an external device of another person. In order to transfer FAX data to another person, transfer data generated from the FAX data is stored in the transmission FA memory 14g as FAX data to be transferred to an external device.

The cover page flag 14h is a flag indicting whether a cover page for transmission of received FAX data to another person should be created automatically. If the cover page flag 14h is ON, a cover page including information representing a source of the received FAX data is created automatically and is added to the FAX data to be transferred.

The cover page flag 14h is tuned to ON when an automatic cover page creation button 56d (see FIG. 18A) is touched through the FAX transfer mode screen 56 during a transferring process (see FIG. 20), and is turned to OFF when page data of a cover page is added to FAX data to be transferred during a FAX transmission process executed subsequently (see FIG. 17).

The cover page memory 14i is a memory area which stores page data of a cover page created automatically in the transferring process in response to the fact that the automatic cover page creation button 56d is touched.

The user information memory 14j is a memory area which stores user information specifying the MFP 1C. The user information to be stored in the user information memory 14j includes information for communicate with the MFP 1C (e.g., a facsimile number, a telephone number or an e-mail address), and information concerning the user of MFP 1C (e.g., a name or a residential address).

The data structure of the personal information memory 14b1 and the image information memory 14b2 has already been explained with reference to FIGS. 3A-3C.

Hereafter, processed for notifying the user of a source of FAX data using photographs registered in the telephone book memory 14b are explained with reference to FIGS. 13A-13D, 14 and 16. FIGS. 13A-13C illustrate screens displayed during execution of processes shown in FIGS. 14 and 15. FIG. 13D illustrates a screen in which an image representing contents of the received FAX data is displayed.

FIG. 13A illustrates the reception screen 51C displayed on the LCD 16 when a reception request of FAX data is received. As shown in FIG. 13A, in the reception screen 51C, a display area is divided into two parts. On the left side part, the display area 51a in which a photograph is displayed is provided.

Figure 14:
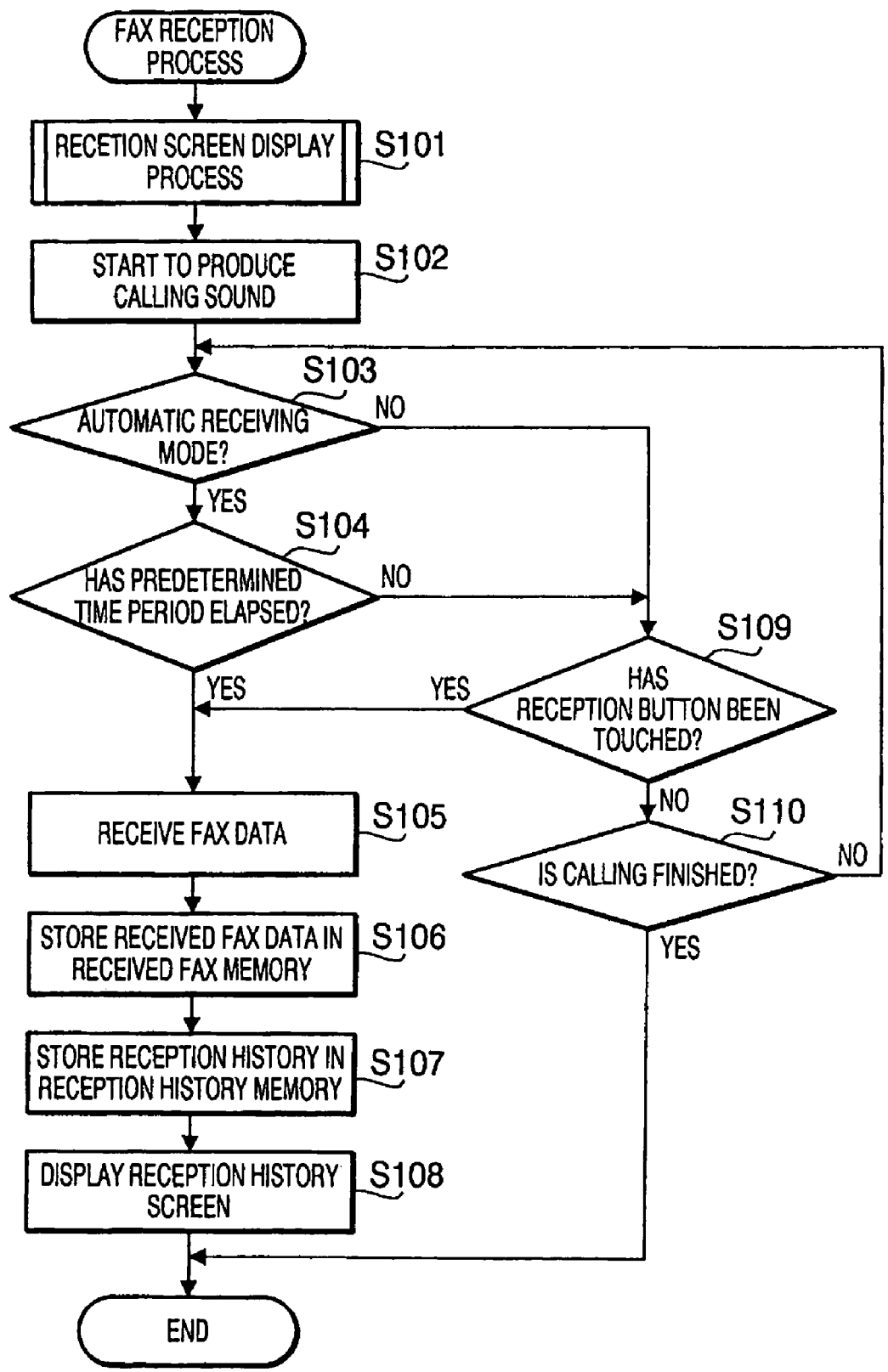
FIG. 14 is a flowchart illustrating a FAX reception process executed by the MFP.

As described in detail later, when a reception request of FAX data is received, the MFP 1C displays a photograph which is selected in accordance with a predetermined rule by a reception screen display process shown in FIG. 15 which is apart of the FAX reception process shown in FIG. 14. In this case, if a source of the FAX data (i.e., a party on the other side) is a person who has been stored in the telephone book memory 14b, the area 51b corresponding to the source of the FAX data is highlighted, for example, by blinking so that the area 51b associated with the source can be distinguished from other areas 51c.

As described above, when a photograph is displayed in the display area 51a, the area 51b corresponding to the source of the FAX data is displayed to be distinguished from other areas 51c associated with the personal information PD. Therefore, the user is able to easily identify the party who has transmitted the FAX data.

When a reception request of FAX data is received, a notification 51e "FAX is received" and a reception button 51f for manually closing the telephone line are displayed in the area 51d on the right part of the reception screen 51C. Further, if the party who sent the reception request of the FAX data is stored in the telephone book memory 14b, the personal information PD of the party is displayed in the area 51d. If the user touches the reception button 51f, the telephone line is closed and reception of the FAX data is started.

As described above, according to the MFP 1C, the photograph including the source of the FAX data (i.e., the party who sent the reception request of the FAX data) and the personal information PD are displayed simultaneously on the LCD 16. Therefore, the user is able to obtain information directly concerning the source of the FAX data from the personal information PD, and to obtain indirect information concerning the source of the FAX data (e.g., relationship between persons including the party). Such a configuration enables the user to easily recognize the source of the FAX data.

As shown in FIG. 13A, the name P2, the facsimile number P3, and the residential address P4 are displayed in the area 51d of the reception screen 51C. That is, on the reception screen 51C, additional information, such as the residential address P4, is displayed in addition to the name P2 and the facsimile number P3. Such a configuration enables the user to conceive the party.

If a plurality of photographs each of which includes the source of the FAX data (i.e. the party who sent the reception request of the FAX data) are stored, a plurality of tabs 51b respectively indicating names of the photographs each of which includes a source of the FAX data are displayed as shown in FIG. 13A. By touching one of the tabs 51g, the user is able to change photographs to be displayed in the area 51a. Therefore, by changing the photograph in the display area 51a, the user is able to start reception of the FAX data after properly recognizing the party who sent the reception request for the FAX data.

FIGS. 13B and 13C illustrate examples of the reception history screen 52C indicating status of reception history of FAX data. More specifically, FIG. 13B illustrates the reception history screen 52 generated when the number of histories of reception stored in the reception history memory 14d is one. FIG. 13C illustrate the reception history screen 52C generated when the number of histories of reception stored in the reception history memory 14d is more than one.

As shown in FIGS. 13B and 13C, on the left side of the reception screen 52C displayed on the LCD 16, the display area 52a in which a photograph can be displayed is provided. Under the display area 52a, the tabs 52b (see FIG. 13B) or the tabs 52c (see FIG. 13C) are displayed. By touching one of the tabs (52b or 52c), the user is able to select a photograph to be displayed in the display area 52a.

If the number of reception histories is one as shown in FIG. 13B, a name of a photograph is presented in the tab 52b. On the other hand, if the number of reception histories is two or more, reception times are respectively presented on the tabs 52b.

If a plurality of photographs each of which includes the party (i.e., the source of the FAX data) stored as one reception history as shown in FIG. 13B are stored, a plurality of tabs 52b respectively displaying names of the photographs are displayed. If the number of histories stored in the reception history is more than one, the tables 52c to which reception times are respectively assigned are displayed. If a plurality of photographs each of which includes the source of the FAX data exist, more than one tabs 52c are assigned to one photograph as shown in FIG. 13C.

The user is able to change the photograph to be displayed in the display area 52a by touching one of the tabs 52b or 52c. Therefore, even if a plurality of photographs exist because of existence of more than one reception histories, or even if a plurality of photographs each of which includes the party stored as one reception history exist, the user is able to display desired one of the plurality of photographs by touching one of the tabs 52b or 52c.

As described above, a photograph selected through a user operation in the tabs 52c or 52b can be displayed in the entire display area 52a. Such a configuration enables the user to visually recognize the displayed photograph. That is, the user is able to easily select a desired image. Consequently, usability of the MFP 5C can be enhanced.

As shown in FIG. 13B, when a photograph is displayed in the display area 52a on the reception history screen 52, the area 52d corresponding to the party stored as a reception history is highlighted, for example, by blinking, to be distinguished from other areas 52f associated with the personal information. Further, in this case, the reception time 52e is displayed near the area 52d.

As described above, if the reception history exists, the area corresponding to the party (i.e., the source of the FAX data) stored in the reception history in the photograph displayed in the display area 52 is distinguished from other areas 52f associated with the personal information. Such a configuration enables the user to easily identify the party stored in the reception history.

If a plurality of histories of reception respectively corresponding to a plurality of destinations exist, the areas 52d and 52g respectively corresponding to the sources of the FAX data stored in the reception history data are highlighted to be distinguished from other areas 52f associated with the personal information, and further the area 52d and the area 52g respectively corresponding to the parties stored in the reception history data are displayed to be distinguished with respect to each other (for example, by differentiating the time intervals or colors of blinking). In addition, the reception time 52e is displayed near the area 52d or 52g.

As shown in FIG. 13C, if a plurality of reception histories have been stored, a photograph associated with the personal information PD of the party who is stored as the latest history in the reception history data is displayed preferentially. That is, when onscreen representation is switched from the reception screen 51C to the reception history screen 52C or when onscreen representation switches from a certain screen to the reception history screen 52C in accordance with a user command, the photograph containing the party stored as the latest history is displayed preferentially in the display area 52a. Such a configuration enables the user to recognize the latest source of the received FAX data through the reception screen 52C.

In other words, in one photograph, the areas respectively corresponding to the parties stored in the reception history data are outputted such that the areas can be distinguished with respect to each other. Therefore, the user is able to recognize the existence of a plurality of reception histories stored in the reception history data, and to intuitively recognize the relationship between the parties stored in the reception history data through one photograph displayed in the display area 52a.

In the rightward area 52h on the reception history screen 52C displayed on the LCD 16, the personal information PD representing the source of the FAX data is displayed. If the reception history data stores a plurality of reception histories, the personal information PD of the party corresponding to the latest reception history in the reception history data or the personal information PD corresponding to the photograph or an area selected by the user is displayed.

As shown in FIGS. 13B and 13C, the name P2, the phone number P3 and the residential address P4 are displayed as the personal information PD in the area 52h. Since additional information, such as the residential address P4, is displayed in the reception history screen 52C in addition to the name P2 and the phone number P3, the user is able to easily conceive the party stored in the reception history.

As shown FIGS. 13B and 13C, if the reception history data exists, the MFP 1C displays a balloon 52j drawn from each area (52d, 52d) corresponding to the party stored in the reception history in the photograph displayed in the display area 52a. In the balloon 52j, a message "FAX is received." is presented. Therefore, the user is able to know the fact that the FAX data has been received from the party corresponding to the area (52d or 52g) related to the balloon 52j.

If the user touches the balloon 52j, an image indicating contents of the FAX data received from the party corresponding to the area (52d or 52g) related to the touched balloon 52j is displayed on the received FAX display screen 55 (see FIG. 13D). Therefore, when the reception history data exists, the user is able to display the image indicating contents of the FAX data received from the party indicted by the balloon 52j. Such a configuration enables the user to intuitively check the contents of the received FAX data.

As described above, according to the MFP 1C, the photograph including the party (the source of the FAX data) recorded as the reception history and the personal information PD are simultaneously displayed on the LCD 16. Therefore, the user is able to obtain direct information concerning the party recorded as the reception history and to obtain indirect information concerning the party (e.g., relationship between persons including the party) from the corresponding photograph. Such a configuration enables the user to easily recognize the party.

FIG. 13D illustrates the received FAX display screen 55 displayed when the balloon 52j presented on the reception history screen 52C is touched by the user. In the received FAX display screen 55, each page of the contents of the received FAX (pages Pg1, Pg2 and Pg3 in the example shown in FIG. 13D) is displayed as a thumbnail image. Further, in the received FAX display screen 52C, function buttons including a print button 55a, a transfer button 55b and a deletion button 55c are displayed to allow the user to input commands for the displayed FAX data.

The print button 55a is a button for instructing the MFP 1C to print an mage corresponding to the contents of the received FAX data designated by the user by touching the balloon 52j on the reception history screen 52 (i.e., each of the pages Pg1, Pg2 and Pg3 being displayed on the received FAX display screen 55). That is, when the print button 55a is touched, the MFP 1C prints each of the pages Pg1, Pg2 and Pg3 being displayed on the received FAX display screen 55.

The deletion button 55c is a button for instructing the MFP 1C to delete the FAX data corresponding to the pages Pg1, Pg2 and Pg3 being displayed on the received FAX display screen 55 from the received FAX memory 14f. That is, when the deletion button 55c is touched, corresponding FAX data is deleted from the received FAX memory 14f.

Figure 20:
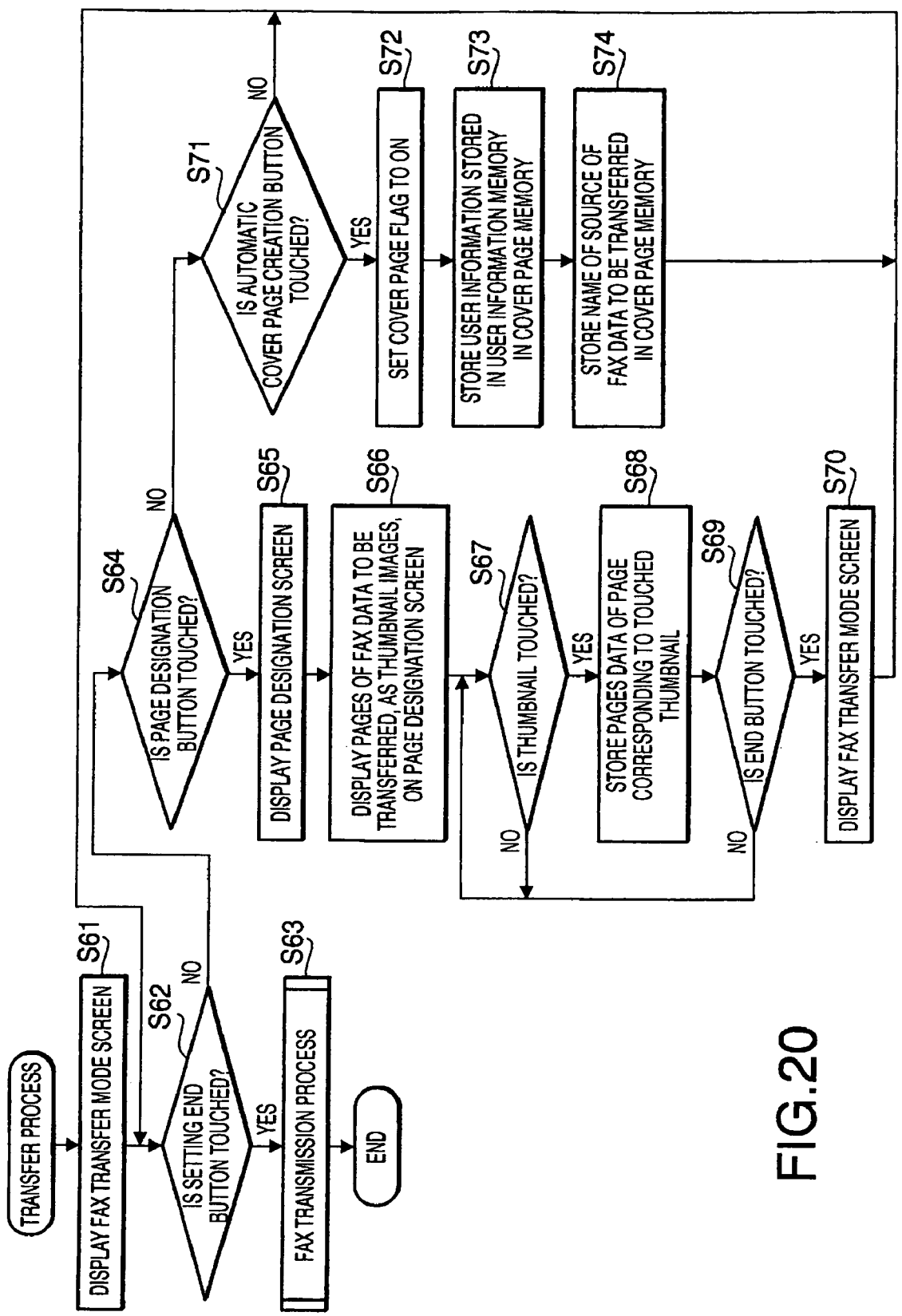
FIG. 20 is a flowchart illustrating the transfer process.

The transfer button 55d is a button for instructing the MFP 1C to transfer at least part of the pages Pg1, Pg2 and Pg3 being displayed on the received FAX display screen 55 to an external device of another person. As described in detail below, when the transfer button 55b is touched, the transfer process shown in FIG. 20 is started and a FAX transfer mode screen 56 (see FIG. 17A) is displayed. As a result, the user becomes able to transfer at least part of the pages Pg1, Pg2 and Pg3 to another person.

Hereafter, a FAX reception process executed when a reception request for FAX data is received is described with reference to FIGS. 14 and 15. FIG. 14 is a flowchart illustrating the FAX reception process executed under control of the CPU 11 of the MFP 1C. FIG. 15 is a flowchart illustrating a reception screen display process executed in the FAX reception process shown in FIG. 14.

The FAX reception process is started when a reception request for FAX data is received from a predetermined external device. First, the CPU 11 executes the reception screen display process (step S1). The reception screen display process is described later with reference to FIG. 15.

After the reception screen 51C is displayed through the reception screen display process (S101), the CPU 11 starts to produce a calling sound (step S102). Then, the CPU 11 judges whether the MFP 1C is in an automatic receiving mode (i.e., whether an automatic reception setting has been set) (step S103). If the MFP 1C is in the automatic receiving mode (S103: YES), the CPU 11 judges whether a predetermined time period has elapsed (e.g., whether reproduction of the beeping (calling) sound has been executed for a predetermined number of times) (step S104).

If the predetermined time period has elapsed (S104: YES), control proceeds to step S105. If the predetermined time period has not elapsed (S104: NO), the CPU 11 judges whether a reception button 51*f* displayed on the reception screen 51C has been touched (step S109). If the reception button 51*f* has been touched (S109: YES), control proceeds to step S105.

If the reception button 51*f* has not been touched (S109: NO), the CPU 11 judges whether calling is finished (i.e., whether the reception request for FAX data is finished.) (step S110). If calling is continuing (S110: NO), control returns to step S103.

In step S105, the CPU 11 starts to receive the FAX data. After step S5 is processed, the CPU 11 stores the received FAX data in the received FAX memory 14*f* (step S106). Then, the CPU 11 stores, in the reception history memory 14*d'*, a time (a reception time) when the FAX data is received, a facsimile number of the sources (i.e., information indicating the source of the FAX data), and information indicating a memory area of the FAX data in the received FAX memory 14*f* (step S107).

After step S7 is processed, the CPU 11 displays the reception history screen 52C on the LCD 16 in place of the reception screen 51C. Then, the FAX reception process terminates. It should be noted that when the reception history screen 52C is displayed on the LCD 16, an image displayed firstly in the display area 52*a* is selected in accordance with the same rule used in the reception screen display process executed in step S101.

Hereafter, the reception screen display process is described with reference to FIG. 15. First, the CPU 11 checks whether a reception history has been stored in the reception history memory 14*d* (step S111).

If a reception history has been stored in the reception history memory 14*d'* (S111: YES), the CPU 11 judges whether a photograph containing a party who requested the reception of FAX data and other persons also stored in the reception history memory 14*d'* has been stored in the telephone book memory 14*b* (the image information memory 14*b*2) (step S112).

If a photograph containing the party who requested the reception of FAX data and other persons also stored in the reception history memory 14*d'* has been stored in the telephone book memory 14*b* (S112: YES), the CPU 11 displays the reception screen 51C using the photograph containing the party who requested reception of FAX data and other persons also stored in the reception history memory 14*d'* (step S113). In this case, the photograph is displayed such that an area associated with the party who requested reception of FAX data is distinguished from other areas, for example, by blinking the area associated with the party (see FIG. 13A).

If no history has been stored in the reception history memory 14*d'* (S111: NO) or a photograph containing a party who requested reception of FAX data and other persons also stored in the reception history memory 14*d'* has not been stored in the telephone book memory 14*b* (S112: NO), control proceeds to step S114. In step S114, the CPU 11 judges whether a transmission history for the party who requested reception of FAX data has been stored in the transmission history memory 14*c'*.

If a transmission history for the party who requested reception of FAX data has been stored in the transmission history memory 14*c'* (S114: YES), the CPU 11 selects a photograph which has been used at the latest execution of facsimile transmission, from among transmission histories stored in the transmission history memory 14*c'*, generates the reception screen 51C using the selected photograph and displays the reception screen 51C (step S115). At this time, the CPU 11 blinks the area associated with the party who requested reception of FAX data to distinguish the area associated with the party from other parts (see FIG. 13A).

If no transmission history for the party who requested reception of FAX data has been stored in the transmission history memory 14*c'* (S114: NO), the CPU 11 judges whether a plurality of photographs each of which is associated with the party who requested reception of FAX data have been stored in the telephone book memory 14*b* (the image information memory 14*b*2) (step S116).

If a plurality of photographs each of which is associated with the party who requested reception of FAX data have been stored in the telephone book memory 14*b'* (S116: YES), the CPU 11 judges whether the plurality of photographs associated with the party include group photographs each of which is associated with the party who requested reception of FAX data (step S117).

If group photographs are included in the plurality of photographs associated with the party (S117: YES), the CPU 11 generates the reception screen 51C using one of the group photographs stored firstly in the telephone book memory 14*b*, and displays the reception screen 51C on the LCD 16 (step S118). In this case, the CPU 11 displays the group photograph such that the area corresponding to the party who requested reception of FAX data is distinguished from other parts, for example, by blinking the area associated with the party, as shown in FIG. 13A.

If no group photograph is found (S117: NO), the CPU 11 generates the reception screen 51C using a photograph stored firstly in the telephone book memory 14*b*, and displays the reception screen 51C on the LCD 16 (step S120). In this case, the CPU 11 displays the photograph such that the area corresponding to the party who requested reception of FAX data is distinguished from other parts, for example, by blinking the area associated with the party, as shown in FIG. 13A.

If a plurality of photographs each of which is associated with the party who requested reception of FAX data have not been stored in the telephone book memory 14*b* (S116: NO), the CPU 11 judges whether a photograph associated with the party who requested reception of FAX data has been stored in the telephone book memory 14*b* (step S119).

If a photograph associated with the party who requested reception of FAX data has been stored in the telephone book memory 14*b* (S119: YES), the CPU 11 generates the reception screen 51 using the one photograph which has been stored firstly in the telephone book memory 14*b* (step S120). In this case, the CPU 11 displays the photograph such that the area associated with the party who requested reception of FAX data is distinguished from other parts, for example, by blinking the area associated with the party in the reception screen 51 (see FIG. 13A).

If no photograph associated with the party who requested reception of FAX data has been stored in the telephone book memory 14*b* (S119: NO), the CPU 11 generates the reception screen 51C using a predetermined image not relating to the party (e.g., an image in which a shape of a person and a message "NO DATA" are depicted), and displays the reception screen 51C on the LCD 16 (step S121).

After step S113, S115, S118, S120 or S121 are processed, the reception screen display process terminates. Then, control returns to the FAX reception process shown in FIG. 14.

Therefore, according to the above described FAX reception process, when a reception request for FAX data is received, a photograph selected in accordance with a predetermined rule (defined in the reception screen display process) is displayed in the display area 51a of the reception screen 51C. On the other hand, if the FAX data has been received in response to the reception request for FAX data, a photograph selected in accordance with the same rule as the predetermined rule defined in the reception screen display process is displayed in the display area 52a of the reception history screen 52. Therefore, the user is able to easily obtain additional information concerning the party on the other side (i.e., a party who requested reception of FAX data or a source of the received FAX data) by visually checking the entire photograph displayed in the display areas 51a and 52a.

Therefore, according to the above described FAX reception process, when a request for communication is received, a photograph selected in accordance with a predetermined rule (steps S111-S113 and S117-S121) is displayed in the display area 51a of the reception screen 51C. On the other hand, if a request for communication is received but the request is finished without starting communication for the request, a photograph selected in accordance with the same rule is displayed in the display area 52a of the unattended time incoming history screen 52C. Therefore, the user is able to easily obtain additional information concerning the party on the other side by visually checking the entire photograph displayed in the display areas 51a and 52a.

As described above, regarding selection of a photograph to be displayed in the display area 51a of the reception screen 51C and in the display area 52a of the reception history screen 52C, a photograph to be displayed preferentially is determined in accordance with the predetermined rule.

According to the predetermined rule, if reception histories of persons other than the party being processed currently (i.e., a party who requested reception of FAX data or a source of received FAX data) exist, the MFP 1 places the first priority on displaying, in the display area 51a or 52a, a photograph in which the party currently being processed is shot with other persons stored as the reception histories. That is, a photograph including a plurality of pieces of personal information PD including the party who requested reception of FAX data (i.e., the latest party who requested reception of FAX data) is displayed preferentially. Therefore, from one photograph, the user is able to recognize that a plurality of reception requests for FAX data (including past reception requests for FAX data) have been received from a plurality of persons. Such a configuration enhances effectiveness in checking reception histories of FAX data.

As described above, the CPU 11 places the second highest priority on displaying a photograph which is selected from among transmission histories for the party currently being processed and has been used at the time of the latest execution of FAX transmission. That is, a photograph stored as a transmission history is displayed. Such a configuration enables the user to recognize the party who requested reception of FAX data based on the user's own memory concerning past requests for transmission of FAX data.

In particular, since the photograph used for the latest execution of FAX transmission is selected from the from transmission histories and is displayed, the user is able to easily recall the party who requested reception of FAX data.

As described above, the CPU 11 places the third priority on displaying a group photograph including a party currently being processed. Since such a group photograph including the party being processed is displayed, the user is able to obtain indirect information, such as relationship between persons including the party, by visually checking the group photograph. That is, the user is able to obtain a large amount of information concerning the party who requested reception of FAX data.

As described above, a photograph which has been firstly registered in the telephone book memory 14b, i.e., a photograph which has been associated with the personal information when the personal information has been firstly stored in the personal information memory 14b1, is used preferentially. Such a configuration enables the user to easily recognize a correspondence between the personal information PD and the photograph, and to easily recognize the party who requested reception of FAX data.

Hereafter, a FAX transmission process for transmitting or transferring FAX data to a destination using a telephone book stored in the telephone book memory 14b is explained with reference to FIGS. 16A-16D and 17. FIGS. 16A-16D illustrate examples of transmission screens 53C displayed on the LCD 16 during execution of the FAX transmission process.

FIG. 16A illustrates the transmission screen 53C used to select a photograph including desired personal information PD. As shown in FIG. 16A, the transmission screen 53C is divided into two areas including the leftward display area 53a in which a photograph can be displayed. Under the display area 53a, tabs 53 for selecting a desired photograph to be displayed in the display area 53a are displayed. In this state, the user is allowed to select a photograph including a desired destination by touching a corresponding tag 53b with the user's finger. In the display area 53a, the photograph selected by the user is displayed.

Such a configuration enables the user to select a photograph including a desired destination of transmission or transfer of FAX data. That is, the user is able to select a destination through an easy user operation.

The user is also able to switch photographs to be displayed in the display area 53a by touching one of the tabs 53. That is, when the user searches for a photograph including a destination of transmission or transfer of FAX data from among a plurality of photographs, the user is allowed to select a desired one of the photographs by touching one of the tabs 53b and to display largely the selected photograph in the display area 53a. Since one of the photographs can be displayed largely in the display area 53a, the user is able to easily specify a desired destination of transmission or transfer of FAX data from among the plurality of photographs.

FIG. 16B illustrates a state where the user has touched a desired area, to which the personal information PD of the desired destination of transmission or transfer of FAX data is related, on the photograph being displayed in the display area 53a. When the area (the area 53c in FIG. 16B) to which the desired personal information PD is related is touched by the user, the CPU 11 highlights the touched area (53c), for example by blinking the area 53c, to distinguish the touched area from other areas.

When the area 53c to which the personal information PD is related is touched by the user, the personal information PD associated with the touched area 53a is displayed in the rightward display area 53d in the transmission screen 53C. The dialing button 53e for dialing a facsimile number corresponding to the personal information displayed in the area 53d is also displayed in the display area 53d. That is, the user is allowed to designate a destination of transmission or transfer of FAX data through the touch panel function. Therefore, the user is able to designate a destination of transmission or transfer of FAX data through an easy user operation.

In particular, when transferring the received FAX data, the user is able to designate a destination of transfer of the FAX data on a photograph including an area associated with the personal information of the source of the received FAX data and an area associated with other personal information PD. That is, the user is able to designate the destination of transfer of the FAX data using the photograph including an area associated with the personal information PD of the source of the received FAX data and an area associated with other personal information PD. Such a configuration enables the user to easily search for a destination of transfer of received FAX data.

FIG. 16C is the transmission screen 53C illustrating a situation where the personal information PD displayed in the display area 53d (i.e., the person associated with the display area 53c on the photograph) has been determined as a destination of transmission or transfer of FAX data and the user starts dialing. As shown in FIG. 16C, the user is able to start a request for transmission of FAX data to the destination (i.e., the destination associated with the area 53c) by touching the dialing button 53e in the state where the personal information PD is displayed in the area 53d.

FIG. 16D is the transmission screen 53 illustrating a situation where the user touches a person image 53f displayed in the area 53d in the mode where the MFP 1 extracts a photograph corresponding to the personal information based on the personal information. As shown in FIG. 16D, on the right side of the LCD 16, the person image 53f corresponding to a cutout from the area 53c is displayed.

In the mode where the MFP 1 extracts a photograph corresponding to the personal information based on the personal information, the user is able to instruct the MFP 1 to extract photographs associated with a photograph corresponding to the person image 53f (i.e., the personal information PD displayed in the area 53d) by touching the person image 53f displayed in the area 53d. Furthermore, the user is able to select and display one of extracted photographs by touching one of tags 53b.

Hereafter, the FAX transmission process for transmitting FAX data to a destination of transmission or transfer based on the telephone book is described with reference to FIG. 17. FIG. 17 is a flowchart illustrating the FAX transmission process executed under control of the CPU 11 of the MFP 1C. The FAX transmission process is started when a command for transmitting FAX data is inputted or a setting end button 56e provided on a FAX transfer screen 56 (see FIG. 18A) is touched during execution of a transfer process (see FIG. 20).

When the FAX transmission process is started, the CPU resets the person-to-photograph flag 14e (step S131). Then, the CPU 11 displays the transmission screen 53C shown in FIG. 16A (step S132). In this case, in the display area 53a, one of photographs registered in the telephone book memory 14b is displayed. Further, tabs 53d respectively corresponding to all of the photographs registered in the telephone book memory 14b are displayed.

After step S132 is processed, the CPU 11 judges whether the dialing button 53e in the transmission screen is touched (step S133). If the dialing button 53e is not touched (S133: NO), the CPU 11 judges whether the person image 53f displayed in the area 53d is touched (step S134). If the person image 53f is not touched (S134: NO), control proceeds to step S135.

If the person image 53f is touched (S134: YES), the CPU 11 judges whether the person-to-photograph flag 14e is ON (step S144). If the person-to-photograph flag 14e is OFF (S144: NO), the CPU 11 sets the person-to-photograph flag 14e to ON (step S147). In this case, the MFP 1 moves from a mode where the MFP 1 extracts personal information from a photograph to a mode where the MFP 1 extracts photographs from personal information based on the personal information.

After step S147 is processed, the CPU 11 extracts all the photographs associated with the touched person image 53f (i.e., the personal information PD displayed in the area 53d), and displays the tabs 53b corresponding to the extracted photographs (step S148). Then, control proceeds to step S135.

As a result of step S148, the user is able to display all of the photographs each of which includes the person image 53f by the user operation of touching one of the tags 53b.

If the person-to-photograph flag is ON (S144: YES), the CPU 11 sets the person-to-photograph flag 14e to OFF (step S145). As a result, the MFP 1 moves from the mode where the MFP 1 extracts photographs from personal information based on the personal information to the mode where the MFP 1 extracts personal information from a photograph. That is, each time the person image 53f displayed in the area 53d is touched, the MFP 1 switches between the mode where the MFP 1 extracts photographs from personal information based on the personal information to the mode where the MFP 1 extracts personal information from a photograph.

After step S145 is processed, the CPU 11 displays the tabs 53b corresponding to all the photographs registered in the telephone book memory 14b (step S146). Then, control proceeds to step S135. Therefore, in the mode where the personal information is extracted from a photograph, the user is allowed to instruct the MFP 1C to extract the personal information PD from among all of the photographs registered in the telephone book memory 14b.

In step S135, the CPU 11 judges whether another photograph (which is different from the photograph being displayed in the display area 53a) is selected. That is, the CPU 11 judges whether the tab 53 of a photograph different from the photograph being displayed in the display area 53a is selected.

If the photograph to be displayed is changed by the user (S135: YES), the CPU 11 displays the newly selected photograph in the display area 43a in place of the previously displayed photograph (step S136). Then, control proceeds to step S137. If the photograph to be displayed is not changed (S135: NO), control directly proceeds to step S137.

In step S137, the CPU 11 judges whether the selected person is changed (i.e., whether another area in the photograph being displayed is selected). If another area in the photograph being displayed is selected to change the selected person (S137: YES), the CPU 11 turns the person-to-photograph flag 14e to OFF (step S138).

After step S138 is processed, the CPU 11 displays the tabs 53b corresponding to all of the photographs registered in the telephone book memory 14b (step S139). Then, the CPU 11 reads the personal information PD corresponding to the selected person (i.e., the personal information PD associated with the selected area) from the telephone book memory 14b (i.e., the personal information memory 14b1 and the image information memory 14b2), and displays the personal information n the area 53d (step S140). Then, control returns to step S133.

If the selected person is not changed (i.e., another area in the photograph being displayed is not touched (S137: NO), control returns to step S133.

If the CPU 11 judges in step S133 that the dialing button 53e is touched (S133: YES), the CPU 11 judges whether the cover page flag 14h is ON (step S419).

If the cover page flag 14h is ON (S49: YES), the CPU 11 creates page data of a cover page in accordance with a name (the name P2) of the personal information PD being displayed in the area 53d in the transmission screen 53C and the contents stored in the cover page memory 14i stored in the transfer process shown in FIG. 20 (step S50). Then, the CPU 11 stores the created page data in the transmission FAX memory 14g (step S51).

Since the cover page flag 14h can be set to ON only in the transfer process (see FIG. 20), FAX data (transfer data) to be transferred has already been stored in the transmission FAX memory 14g in which the page data of the cover page is stored in step S51. Therefore, by storing the page data of the cover page in the transmission FAX memory 14g, it is possible to add the page data of the cover page to the FAX data to be transferred.

Figure 19:
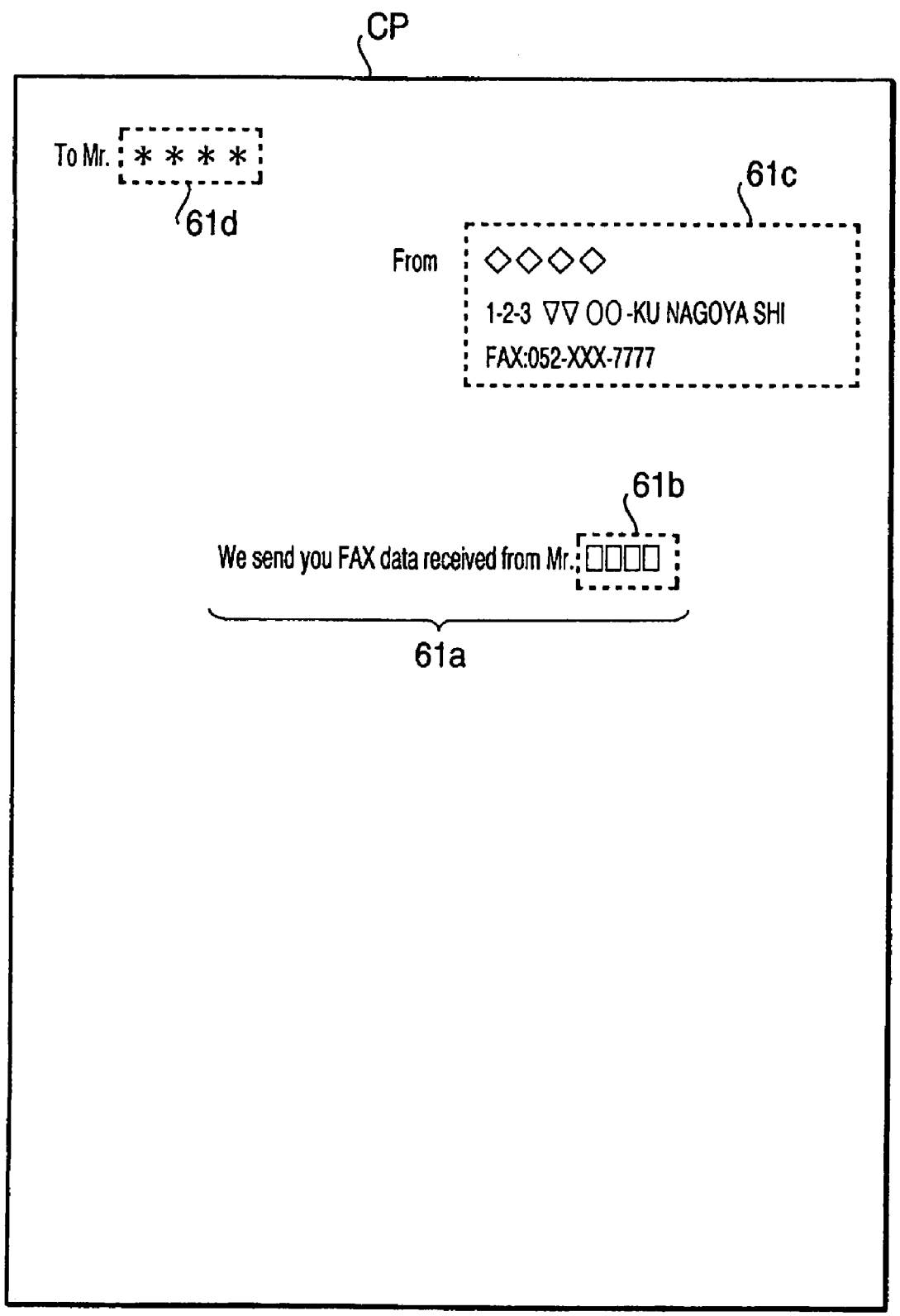
FIG. 19 illustrates an example of a cover page PG created in response to touching on an automatic cover page creation button.

By including the name of the personal information PD being displayed in the area 53d of the transmission screen 53C, the name is represented on the cover page which is added to the FAX data to be transferred, as information indicating a destination of transfer (see an area 61d in FIG. 19).

As described in detail below, when the cover page flag 14h is ON, the user information stored in the user information memory 14i and the name (i.e., the name P2 contained in the corresponding personal information PD) of the source of the FAX data which is to be transferred are represented on the cover page because the user information and the name are also stored in the cover page memory 14i (see areas 61b and 61c in FIG. 19).

After step S51 is processed, the CPU 11 sets the cover page flag 14h to OFF (step S52). Then, control proceeds to step S53. If the cover page flag 14h is OFF (S49: NO), control also proceeds to step S53.

In step S53, the CPU 11 dials the facsimile number O3 contained in the personal information PD (i.e., the personal information PD associated with the area 53d selected by the user) being displayed in the area 53d (step S53). Then, the CPU 11 stores a transmission time, the facsimile number P3 (i.e., information representing the destination), and information representing the photograph being displayed in the display area 53a as a transmission history (step S54). Then, the CPU starts a call (step S55).

After step S55 is processed, the CPU 11 checks whether the telephone line has been closed (step S56). If the telephone line has not been closed (S56: NO), control returns to step S55. If the telephone line has been closed (S56: YES), the CPU transmits the contents (i.e., page data) in the transmission FAX memory 14g (step S57). Then, the FAX transmission process terminates.

As described above, according to the FAX transmission process, the user is allowed to determine a party (i.e., the destination of transmission or transfer of FAX data) while visually checking a photograph displayed on the LCD 16 (i.e., the display area 53a of the transmission screen 53C). Since the user is able to designate a party for communication based on a photograph displayed on the LCD 16, the user is able to start communication after well recognizing the information concerning the party.

Hereafter, the transfer process for transferring the received FAX data to another person is described with reference to FIGS. 18A to FIG. 20.

Figure 18A:
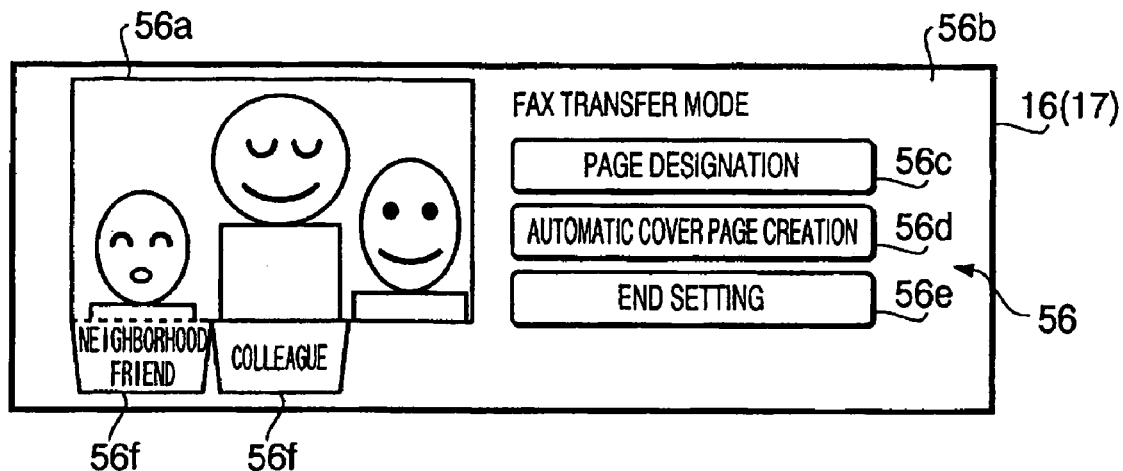
FIGS. 18A and 18B illustrate examples of screens displayed on the LCD during execution of a transfer process.
Figure 18B:
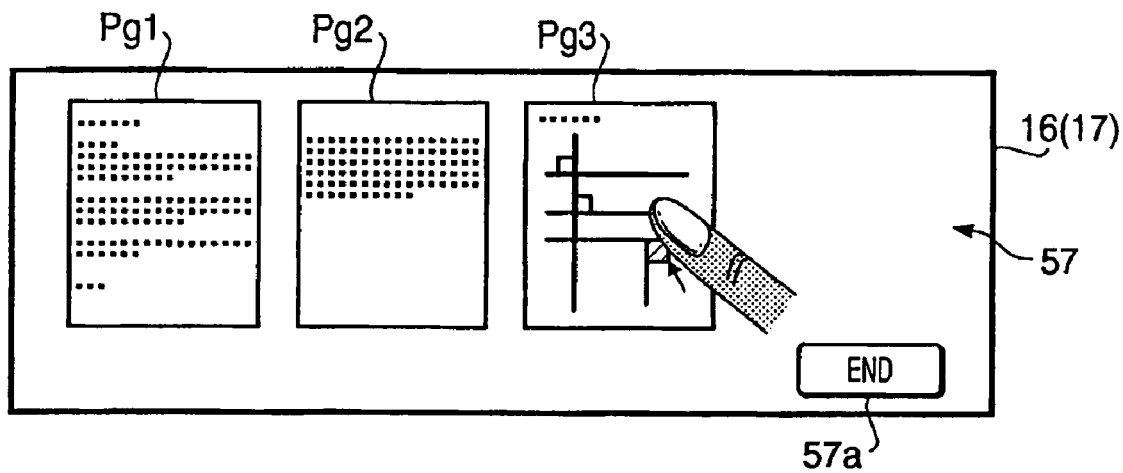

FIGS. 18A and 18B illustrate examples of screens displayed on the LCD 16 during execution of the transfer process shown in FIG. 20.

FIG. 18A illustrates the FAX transfer mode screen 56 displayed on the LCD 16 when the transfer button 55b provided in the received FAX display screen 55 shown in FIG. 13D.

As shown in FIG. 18A, in the FAX transfer mode screen 56, a display area 56a in which one photograph can be displayed is provided in the left side. As shown in FIG. 18a, a photograph is displayed in the display area 56a. In this embodiment, a photograph including the balloon 52j displayed on the reception history screen 52C (see FIG. 13A or 13B) touched by the user to display the received FAX display screen (see FIG. 13D) is displayed firstly in the display area 56a.

Under the display area 56a, tabs 56f for selecting one of photographs to be displayed in the display area 56a are displayed. By touching one of the tabs 56f, for example, by the user's finger, the user is able to display a desired photograph corresponding to the touched tab 53b.

In this embodiment, the tabs 56f corresponding to all the photographs, each of which includes a party corresponding to the balloon 52j displayed in the reception history screen 52C (see FIG. 13A or 13B) touched by the user to display the received FAX display screen 55 (see FIG. 13D) (i.e., all the photographs each of which includes the source of the FAX data to be transferred), are displayed.

The user is able to change the photograph to be displayed in the display area 56a by touching one of the tabs 56f. Such a configuration enables the user to search for a desired destination of transfer while associating the FAX data to be transferred with the source of the received FAX data.

As shown in FIG. 17B, in an area 56b provided on the right side of the FAX transfer mode screen 56, a page designation button 56c, an automatic cover page creation button 56d and a setting end button 56e are displayed.

The page designation button 56c is a button used to designate a page to be transferred from the received FAX data (page data). When the page designation button 56c is touched, the page designation screen 57 (see FIG. 18B) is displayed on the LCD 16, so that the user is allowed to designate a page to be transferred.

The automatic cover page creation button 56d is used to instruct the MFP 1C to create a cover page to be added to the FAX data to be transferred when the received FAX data is to be transferred to another person. When the automatic cover page creation button 56d is touched, page data of a cover page PG as shown in FIG. 19 is created.

Hereafter, the cover page PG created in response to touching on the automatic cover page creation button 56d is explained with reference to FIG. 19. FIG. 19 illustrates an example of the cover page PG created in response to touching on the automatic cover page creation button 56d.

In this embodiment, when the automatic cover page creation button 56d is touched, the cover page CP including at least information representing the source of FAX data to be transferred (i.e., the source of the received FAX data to be transferred) is created.

As shown in FIG. 19, a message 61a indicating the source of the FAX data to be transferred is displayed on the cover page CP. The message 61a includes an area 61b representing a name of the party (source) of the FAX data to be transferred.

The name displayed on the area 61b (i.e., the name of the source of the FAX data to be transferred) is equal to the name P2 extracted from the personal information PD corresponding to the balloon 52j displayed on the reception history screen 52 which has been touched to display the received FAX display screen 55.

As described above, in response to touching on the automatic cover page creation button 56d, the cover page CP in which the message 61*a* for indicating the source of the FAX data to be transferred is displayed is created automatically. Such a configuration enables a person to which the FAX data is transferred to properly recognize the source of the FAX data.

As shown in FIG. 19, on the cover page CP displayed when the automatic cover page creation button 56*d* is touched, an area 61*c* in which user information of the user who instructed the MFP 1C to transfer the FAX data, and an area 61*d* indicating information representing the destination of the transfer are also displayed. It should be noted that the user information displayed in the area 61*c* corresponds to the user information (e.g., name, an residential address and a facsimile number) stored in the user information memory 14*j*, the information representing the destination of the transfer displayed in the area 61*d* corresponds to the name P2 contained in the personal information PD of the destination finally designated.

Returning to FIG. 18A, the setting end button 56*e* is used to confirm transfer of FAX data. when the setting end button 56*e* is touched, the transmission screen 53C (see FIG. 16A) is displayed. Through the transmission screen 53C, the user is able to transfer the FAX data.

FIG. 18B illustrates an example of the page designation screen 57 which is displayed when the page designation button 56*c* provided on the FAX transfer mode screen 56 is touched. On the page designation screen 57, images representing contents of pages of the FAX data to be transferred are displayed as thumbnail images. In the example shown in FIG. 18B, pages Pg1, Pg2 and Pg 3 are displayed. Further, an end button 57*a* for designating termination of page designation is displayed on the page designation screen 57.

As described later, by touching a desired thumbnail selected from the thumbnails displayed on the page designation screen 57, the user is able to designate FAX data to be transferred.

Hereafter, the transfer process is described with reference to FIG. 20. The transfer process is started when the transfer button 55*b* on the received FAX display screen 55 (see 13D) is touched.

First, the CPU 11 displays the FAX transfer mode screen 56 (see FIG. 18A) on the LCD 16 (step S61).

Then, the CPU 11 judges whether the setting end button 56*e* on the FAX transfer mode screen 56 is touched (step S62). If the setting end button 56*e* is not touched (S62; NO), the CPU 11 judges whether the page designation button 56*s* is touched (step S64).

If the page designation button 56*c* is touched (S64: YES), the CPU 11 displays the page designation screen 57 (see FIG. 18B) on the LCD 16 in place of the FAX transfer mode screen 56 (step S65). On the page designation screen 57, the CPU 11 displays pages of the FAX data to be transferred as thumbnail images (step S66).

After step S66 is processed, the CPU 11 judges whether a thumbnail displayed on the page designation screen 57 is touched (step S67). The CPU 11 waits until a thumbnail is touched (S67: NO).

If a thumbnail displayed on the page designation screen 57 is touched (S67: YES), the CPU 11 stores the page data of the page corresponding to the touched thumbnail (step S68). Then, the CPU 11 judges whether the end button 57*a* on the page designation screen 57 is touched (step S69).

If the end button 57*a* is touched (S69: YES), the CPU 11 displays the FAX transfer mode screen 56 again on the LCD 16 in place of the page designation screen 57. Then, control proceeds to step S62 to judge again whether the setting end button 62*e* touched. In step S69, the CPU 11 waits until the end button 57*a* is touched (S69: NO).

Each time a thumbnail displayed on the paged designation screen 57 is touched between the time when the end button 57*a* is touched and the time when the page designation screen 57 is displayed (i.e., during processing for steps S67, S68 and S69), the page data of each page corresponding to the touched thumbnail is stored in the transmission FAX memory 14*g*. Therefore, through the steps S67, S68 and S69, the pages designated by touching thumbnails displayed on the page designation screen 57 are selected as FAX data to be transferred.

If it is judged in step S64 that the page designation button 56*c* is not touched (S64: NO), control proceeds to step S71 where the CPU 11 judges whether the automatic cover page creation button 56*d* is touched.

If the automatic cover page creation button 56*d* is not touched (S71: NO), control returns to step S62 to judge again whether the setting end button 62*e* is touched.

If the automatic cover page creation button 56*d* is touched (S71: YES), the CPU 11 sets the cover page flag 14*h* to ON (step S72). Then, the CPU 11 stores the user information (e.g., a name, a residential address and a facsimile number) stored in the user information memory 14*j* in the cover page memory 14*i* (step S73).

The user information stored in the cover page memory 14*i* in step S73 is displayed on the cover page CP added to the FAX data to be transferred, as information representing a destination of the FAX data to be transferred. In the example shown in FIG. 19, the user information stored in the cover page memory 14*i* is displayed in the area 61*c* on the cover page CP.

Next, the CPU 11 stores the name of the source of the FAX data to be transferred (i.e., the name P2 contained in the corresponding personal information PD) in the cover page memory 14*i* (step S74).

Through step S74, the name stored in the cover page memory 14*i* (i.e., the name of the source of the FAX data to be transferred) is displayed on the cover page CP which is added to the FAX data to be transferred. In the example shown in FIG. 19, the name stored in the cover page memory 14*i* is displayed in the area 61*b* in the cover page CP (i.e., in a part of the message 61*a* indicating a source of the FAX data to be transferred).

After step S74 is processed, control returns to step S62 to judge again whether the setting end button 62*e* is touched. If the setting end button 62*e* is touched (S62: YES), the FAX transmission process shown in FIG. 17 is executed (step S63). Then, the transfer process terminates.

By executing of the FAX transmission process (S63), the page data stored in the transmission FAX memory 14 through steps S67, 68 and 69 (i.e., the page data selected as FAX data to be transferred) can be transferred to a desired destination.

In this case, if the automatic cover page creation button 56*d* is touched, the page data of the cover page CP is automatically created using the contents stored in the cover page memory 14*i* and the personal information PD of the destination designated through the transmission screen 53C displayed in the FAX transmission process (S63), and then the FAX data to which the created page data is added is transferred.

As described above, according to the third embodiment, when a photograph with which not only the personal information PD representing the source of the FAX data but also the personal information PD of another person are associated is displayed on a screen (e.g., the reception screen 51C or the reception history screen 52C) of the LCD 16, the area corresponding to the source of the FAX data is displayed such that the area corresponding to the source of the FAX data is distinguished from other areas corresponding to other personal information PD. Such a configuration enables the user to easily identify the source of the FAX data.

In this case, the user is able to obtain indirect information of the source of the FAX data by consulting the photograph displayed in the reception screen 51 or the reception history screen 52C and then comparing the area corresponding to the source of the FAX data and the areas corresponding to other personal information. Such a configuration enables the user to well understand the source of the FAX data.

According to the third embodiment, the user is able to designate a destination to which the FAX data is to be transferred through a photograph associated with the personal information. Therefore, the user is able to search for a desired destination for transfer based on the relationship with the source of the FAX data.

Fourth Embodiment

Figure 21:
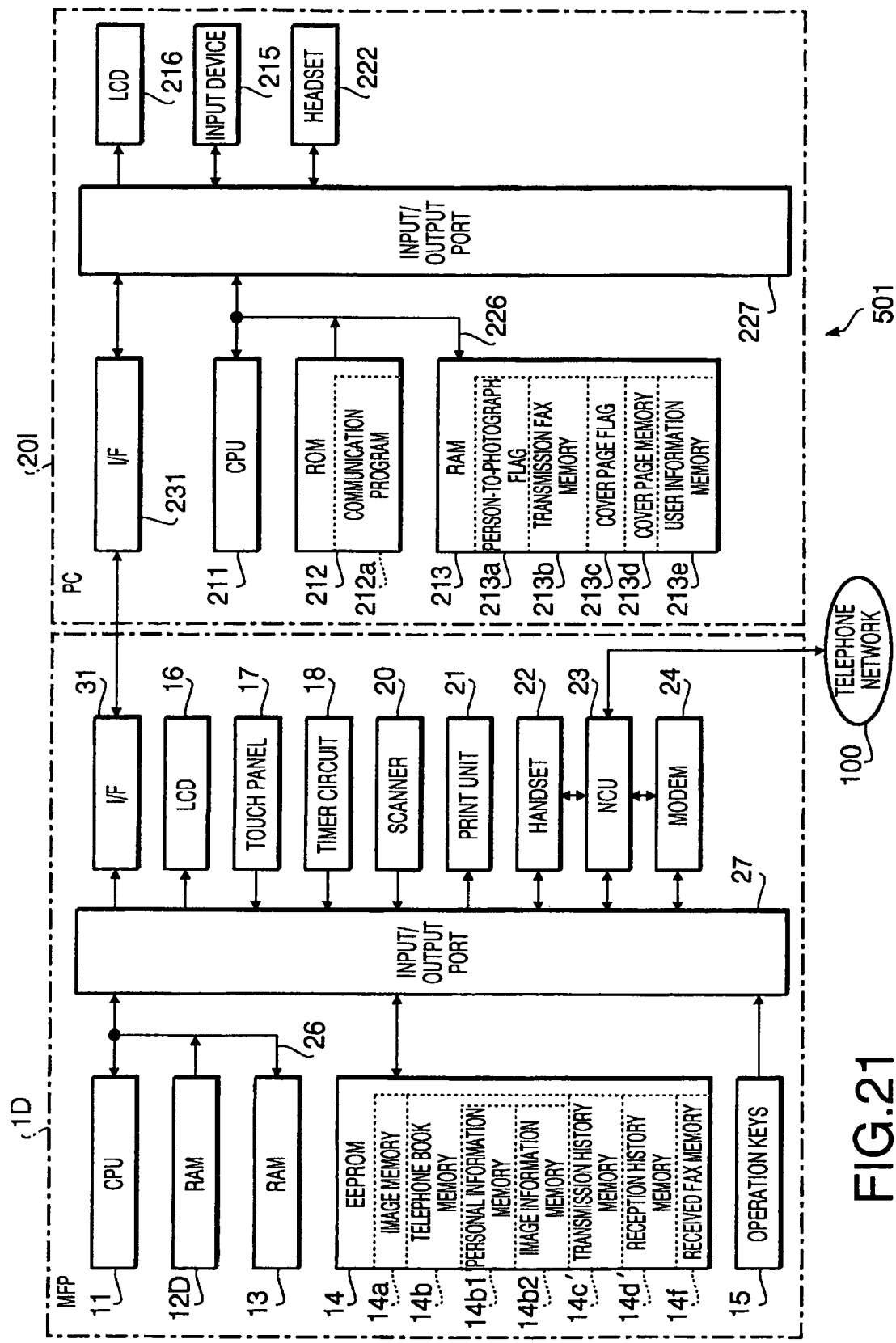
FIG. 21 is a block diagram of a communication system according to a fourth embodiment.

Hereafter, a communication system 501 according to a fourth embodiment is described. FIG. 21 is a block diagram of the communication system 501. As shown in FIG. 21, the communication system 501 includes an MFP 1D and a PC (personal computer) 201.

In the third embodiment, the MFP 1D executes the communication through the telephone network 100 in response to the user operation conducted on the MFP 1C. By contrast, in the fourth embodiment, the MFP 1D executes the communication through the telephone network 100 in response to a user operation conducted on the PC 201.

That is, a basic configuration of the MFP 1D according to the fourth embodiment is substantially the same as that of the MFP 1C according to the third embodiment. Therefore, in FIG. 21, to elements which are substantially the same as those of the third embodiment, the same reference numbers are assigned, and explanations thereof will not be repeated.

As shown in FIG. 21, the MFP 1C and the PC 201 are communicatably connected to each other via the interface (I/F) 31 provided in the MFP 1C and the interface (I/F) 231 provided in the PC 201.

The difference between the MFP 1D and the MFP 1C is that the MFP 1D does not have the communication program 12Ca, the person-to-photograph flag 14*e*, the transmission FAX memory 14*g*, the cover page flag 14*h*, the cover page memory 14*i*, and the user information memory 14*j*. A ROM 12D of the MFP 1D does not have the communication program 12*ca*.

The PC 201 includes a CPU 21, a ROM 212, a RAM 213, an input unit 215, an LCD 216, and a headset 222 which is a headphone integrally provided with a microphone. The CPU 211, the ROM 212 and the RAM 213 are connected to each other via a bus line 226. The input unit 215, the LCD 216, the headset 222 and the bus line 226 are connected to each other via an input/output port 227.

The CPU 211 controls functions of the PC 201 and the components connected to each other via the input/output port 227 in accordance with programs and fixed values stored in the ROM 212 or the RAM 213 and various signals transmitted or received via the NCU 223.

The ROM 212 stores the control program to be executed by the CPU 211 and fixed values to be used to executed the control program. As shown in FIG. 21, the ROM 212 has an area for storing the communication program 212*a*. By executing the communication program 212*a*, processes corresponding to the FAX reception process (see FIG. 14), the reception screen display process (see FIG. 15), the FAX transmission process (see FIG. 17) and the transfer process (see FIG. 20) are executed.

The RAM 213 is used to temporarily store various types of data during execution of the functions of the PC 201. As shown in FIG. 21, the RAM 213 has the person-to-photograph flag 213*a*, the transmission FAX memory 213*b*, the cover page flag 213*c*, the cover page memory 213*d*, and the user information memory 213*e*.

The person-to-photograph flag 213*a* has the same function as the person-to-photograph flag 14*e* described in the third embodiment. That is, the person-to-photograph flag 213*a* is used to judge whether the MFP 1D is in the mode where photographs corresponding to the personal information are extracted based on the personal information during execution of a process corresponding to the FAX transmission process shown in FIG. 17.

The transmission FAX memory has the same function as the transmission FAX memory 14*g* in the third embodiment. That is, the transmission FAX memory 213*b* stores FAX data to be transmitted to an external device via the MFP 1D. Transfer data created from FAX data received through the MFP 1D is stored in the transmission FAX memory 213*b* as FAX data to be transferred to external device.

The cover page memory 213*d* has the same function as the cover page flag 14*h* in the third embodiment. That is, the cover page flag 213*d* is a flag indicating whether to automatically create a cover page when the process corresponding to the transfer process is execute don the PC 201.

The cover page memory 213*d* has the same function as the cover page memory 14*i* in the third embodiment. That is, the cover page memory 213*d* stores the page data of the cover page created through the transfer process.

The user information memory 213*e* has the same function as the user information memory 14*j* in the third embodiment. That is, the user information memory 213*e* stores the user information specifying the MFP 1D or the PC 201 (e.g., a facsimile number, a telephone number, and e-mail address, a name and a residential address).

In the input unit 215 functions as a device for inputting various types of information or commands to the PC 201. The input unit 215 may be formed as a touch panel integrally formed with the LCD 216.

In the fourth embodiment, processes corresponding to the FAX reception process (see FIG. 14), the reception screen display process (see FIG. 15), the FAX transmission process (see FIG. 17) and the transfer process (see FIG. 20) are executed on the PC 201. More specifically, in the processes, such as the FAX reception process, each of the screens 51C, 52C, 53C, 55, 56 and 57 is displayed on the LCD 216. On the screen displayed on the LCD 216, the user is allowed to input a command through the input unit 215. A photograph displayed on each of the screens 51C, 52C, 53C and 56 is read from the image data memory 14*a* of the MFP 1E in accordance with the contents stored in the telephone book memory 14*b*. An image representing contents of received FAX data displayed on the screens 55 and 57 is read from the received FAX memory 14*f* of the MFP 1D.

As described above, according to the communication system 501, a photograph associated with both of the personal information corresponding to a source of FAX data and other personal information is displayed on the LCD 216. In this case, the area corresponding to the source of the FAX data is distinguished from other areas corresponding to other personal information PD. Such a configuration enables the user to easily identify the source of the FAX data.

The user is able to designate a destination of FAX data through a photograph associated with the personal information PD. Such a configuration enables the user to search for a destination of transfer of FAX data based on the relationship with the source of the FAX data. In other words, the user is able to easily search for a destination of transfer of FAX data. It is understood that the communication system 501 achieves the same advantages as those of the third embodiment.

Hereafter, variations of the third and fourth embodiments are described.

In the above described embodiments, received FAX data is transferred to another person in the transfer process. However, data to be transferred is not limited to FAX data. Various types of data received externally may be transferred to another person. For example, regarding a telephone communication, a message (i.e. voice data) left by a party who requested communication may be subjected to the transfer process of the above described embodiments.

In the received FAX display screen 55 (see FIG. 13D), the transfer button 55b for instructing the MFP to transfer the received FAX data to another person is displayed. However, as shown in Fig.

Figure 22:
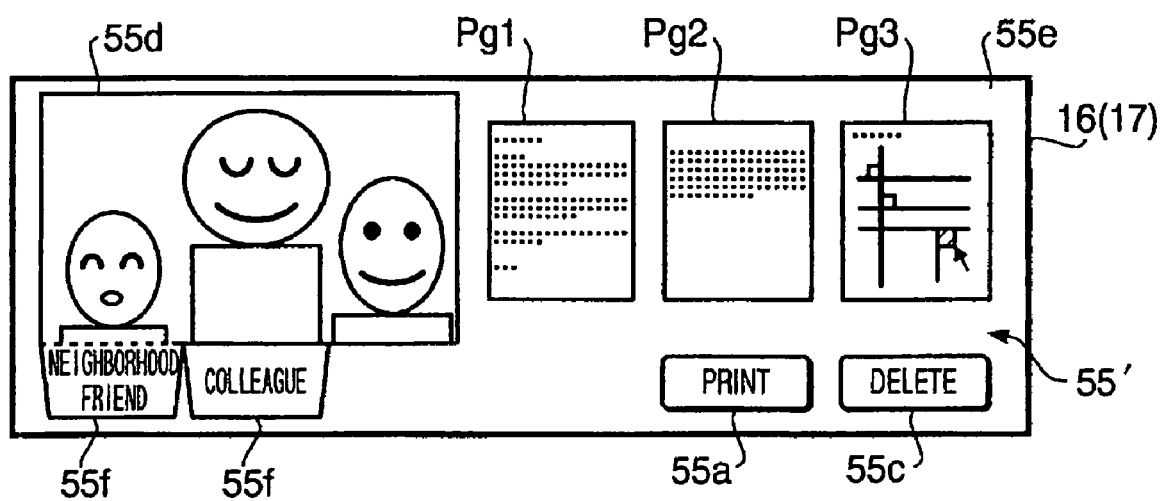
FIG. 22 illustrates a variation of a received FAX display screen.

In the above described embodiments, the transfer button 55b for transferring the received FAX data to another person is provided on the received FAX display screen 55 (see FIG. 13D). However, the received FAX display screen 55 may be configured not to display the transfer button 55b as shown in FIG. 22. FIG. 22 illustrates a variation of the received FAX display screen 55 (a received FAX display screen 55'). In FIG. 22, to elements which are substantially the same as those shown in FIG. 13D, the same reference numbers are assigned, and explanations thereof will not be repeated.

In the received FAX display screen 55' shown in FIG. 22, the display area of the LCD 16 is divided into a plurality of areas. On the left side of the LCD 16, the display area 55d for displaying one photograph is provided. If the balloon 52j displayed on the reception history screen 42 (see FIG. 13B or 13C) is touched, a photograph containing the touched balloon 52j is displayed in the display area 55d.

Under the display area 55d, tabs 55f are provided. By touching one of the tabs 55d, the user is able change the photograph displayed in the display area 55d. The received FAX display screen 55' may be configured such that the tabs 55f corresponding to all of the photographs registered in the telephone book memory 14b are displayed and allows the user to select a photograph including a destination of transfer from among all the registered photographs.

On the rightward area 55e in the received FAX display screen 55', images of the pages Pg1, Pg2 and Pg3 are displayed. By touching one of the Pages Pg1, Pg2 and Pg3 or by touching an area associated with the personal information PD in the photograph displayed in the display area 55d, the FAX transfer mode screen (see FIG. 18A) is displayed.

The received FAX display screen 55' may be configured such that when the area associated with the personal information PD in the photograph displayed in the display area 55d is touched, the personal information PD associated with the touched area and a dial button for dialing the facsimile number of the personal information PD displayed in the area 55d are displayed in the area 55e.

In the above described embodiment, the FAX transfer mode screen 56 (see FIG. 18A) is configured such that the user is allowed to designate a page by touching the page designation button 56c and to execute the automatic creation of the cover page by touching the automatic cover page creation button 56d.

For example, when the area associated with the personal information PD in the photograph displayed in the display area 56a is touched, the personal information PD corresponding to the touched area and the dial button for dialing the facsimile number of the personal information PD displayed in the area 56b may be displayed in the area 56b so that the same onscreen representation shown in FIG. 16B can be provided. Alternatively or additionally, the tabs 56f corresponding to all the photographs registered in the telephone book memory 1b may be displayed so as to allow the user to select a photograph including a destination of transfer.

In the above described embodiment, both of a photograph to be displayed in the area 51a of the reception screen 51 when a reception request for FAX data is received and a photograph to be displayed in the area 52a of the reception history screen 52 after reception of FAX data is determined in accordance with the predetermined rule for determining priority for displaying photographs. It should be understood that the order of priority for displaying photographs is not limited to those shown in the above described embodiments. Various types of conditions may be considered to determine the order of priority for displaying photographs. Various types of predetermined orders for displaying photographs may be adopted.

In the above described embodiment, the area corresponding to the party for communication is highlighted so that the area can be distinguished from other areas on the reception screen 51C, the reception history screen 52C and the transmission screen 53C. In this case, the area corresponding to the party for communication is highlighted by blinking the area or coloring the area.

In the above described embodiments, the display area of the LCD 16 is divided into the two parts including the leftward display area (e.g., the display area 51a) and the right ward area displaying the personal information PD (e.g., the area 51d). However, the number of divided areas of the LCD 16 is not limited to the example shown in the above described embodiments. For example, the display area of the LCD 16 may be divided into more than two areas. In such a case, the amount of information to be displayed simultaneously on the LCD 16 can be increased. Such a configuration also makes it possible to deeply recognize the party for communication.

In the above described embodiment, by touching an area in a photograph displayed on the LCD 16 which is integrally formed with the touch panel 17, the user designates an area defined in the photograph. However, the MFP may be configured to allow the user to select an area defined in a photograph by pointing to an image displayed on the LCD 16 with a cursor or a pointer which moves in response to a user operation conducted through the operation keys 15.

In the above described embodiment, the user is allowed to visually check a plurality of photographs associated with the personal information PD corresponding to one person. However, it is also possible to allow the user to visually check the personal information PD common to a plurality of photographs by associating the common personal information PD with a plurality of photographs. By thus configuring the MFP to allow the user to refer to the personal information PD common to a plurality of photographs, the user is able to obtain additional information which can not be obtained from a single photograph.

In the above described embodiment, the personal information PD (i.e., information concerning a person) is associated with a photograph. However, various types of information, such as information concerning a device, an object or a natural object shot in a photograph, may be associated with the photograph. An object with which the personal information PD is associated is not limited to a photograph. For example, the personal information may be associated with a picture or a graphics of a character.

In the above described embodiment, a person (a face of a person) is defined as a area with which the personal information PD is associated. However, various types of parts in a photograph may be defined as an area with which the personal information is associated.

Figure 15:
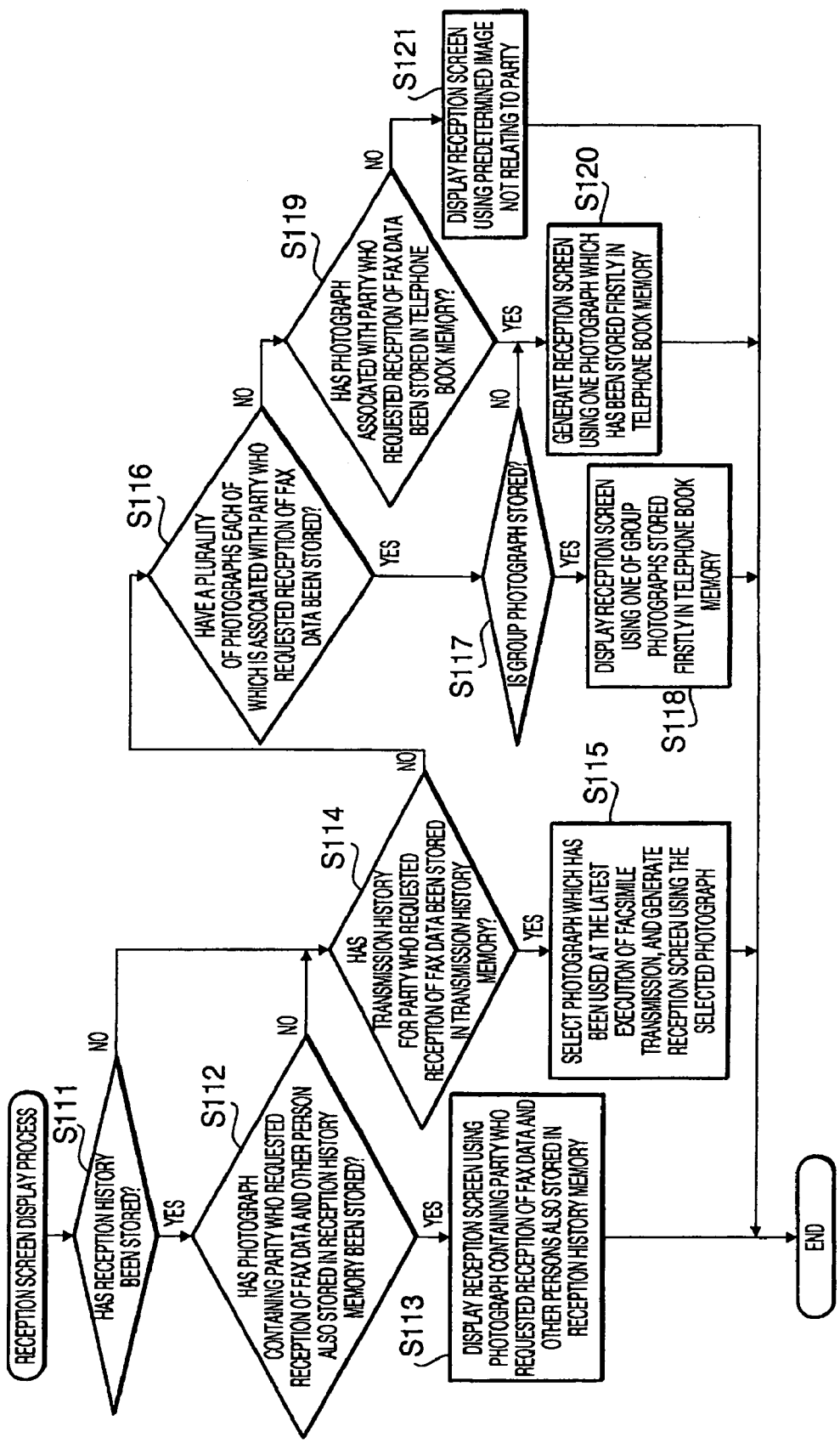
FIG. 15 is a flowchart illustrating a reception screen display process executed in the FAX reception process shown in FIG. 14.

In the above described reception screen display process shown in FIG. 15, if a plurality of photographs associated with the party for communication exist (S16: YES), the MFP checks whether a group photograph is included in the plurality of photographs in step S17. However, the MFP may be configured such that if a plurality of photographs associated with a party for communication exist, the MFP displays, on the reception screen 51C, a photograph which has been stored firstly in the telephone book memory 14*b* regardless of whether the photograph which has been stored firstly in the telephone book memory 14*b* is a group photograph or a non-group photograph, by omitting step S17.

In the above described second embodiment, the image memory 14*a*, the telephone book memory 14*b* (i.e., the personal information memory 14*b*1 and the image information memory 14*b*2) and the transmission history memory 14*c*′, and the reception history memory 14*d*′, the received FAX memory 14 are provided in the MFP 1C. However, part or all of these memories 14*a*, 14*b*, 14*c*′, 14*d*′ and 14*f* may be provided in the RAM 213 of the PC 201.

What is claimed is:

1. A communication device, comprising:
a display screen;
a communication unit configured to communicate with one or more external devices;
an input accepting unit configured to accept input specifying one of a plurality of communication partners;
an image data storage unit configured to store image data;
a registration information storage unit configured to store association information representing associations between a plurality of registration information, at least one image data, and a plurality of areas defined in the at least one image data; and
an output control unit configured to control onscreen representation of the at least one image data on the display screen,
wherein:
 each of the plurality of registration information is associated with one of the plurality of communication partners,
 with respect to the at least one image data, the plurality of registration information is associated with the at least one image data,
 with respect to the at least one image data, the plurality of areas are associated with the at least one image data, at least one of the plurality of registration information is associated with one area of the plurality of areas, and the at least one of the plurality of registration information that is associated with the one area of the plurality of areas is not associated with other of the plurality of areas,
 when the input accepting unit accepts an input specifying one of the plurality of communication partners, the output control unit displays an image corresponding to the at least one image data associated with the specified one of the plurality of communication partners, regardless of which of the plurality of registration information is associated with the one of the plurality of communication partners specified by the input, and
 when the image displayed by the output control unit corresponds to the at least one image data that is associated with the registration information corresponding to one of the communication partners specified by the input accepting unit, the output control unit displays an area of the plurality of areas with which the registration information corresponding to one of the communication partners specified by the input accepting unit is associated in a first style, and displays areas of the plurality of areas with which the registration information corresponding to one of the communication partners specified by the input accepting unit is not associated in a second style different from the first style.

2. The communication device according to claim 1, further comprising a first history storage unit configured to store communication history data when a communication request transmitted by a source is terminated without performing communication for the communication request through the communication unit,
wherein the output control unit is configured to display an image corresponding to the image data associated with the registration information corresponding to a party registered in the communication history data, and to display that image such that an area associated with the registration information corresponding to the party registered in the communication history data is distinguished from other areas.

3. The communication device according to claim 2, wherein the output control unit is configured to display an image corresponding to the at least one image data associated with two or more registration information respectively corresponding to a plurality of parties registered in the communication history data, such that areas respectively corresponding to two or more of the plurality of parties are distinguished from each other.

4. The communication device according to claim 1, further comprising:
a touch panel configured to detect a position pointed by a pointing device on the display screen; and
a communication request output unit configured to output a communication request in response to input of the information designating the one of the plurality of communication partners through the input accepting unit,
wherein:
 the output control unit comprises a first control unit configured, such that, if a designated position which is in the image being displayed on the display screen and is detected by the touch panel corresponds to an area corresponding to the registration information, the first control unit displays the registration information associated with the area corresponding to the designated position on the display screen; and
 the input accepting unit is configured, such that, if a communication start command is inputted in a state where the registration information has been displayed on the display screen, the input accepting unit inputs, to the communication unit, information designating the one of the plurality of communication partners contained in the registration information being displayed on the display screen.

5. The communication device according to claim 1, wherein:
the registration information includes first information representing a name of a party, second information identifying the party, and third information that is additional information concerning the party other than the name and the second information;
the display screen has a rectangular shape having a longer side and a shorter side; and the output control unit comprises a second control unit configured such that when the image corresponding to the image data associated with the registration information is displayed, the second control unit displays the image in a first display area, which is one of a plurality of display areas obtained by dividing the display screen into two parts along the longer side of the display screen, and displays the first information, the second information, and the third information of the registration information corresponding to a source which transmitted the communication request in the other of the plurality of display areas.

6. The communication device according to claim 1,
further comprising a first history storage unit configured to store first communication history data when a communication request is terminated without performing communication for the communication request through the communication unit,
wherein the output control unit comprises:
a third control unit configured, such that, if two or more image data are stored, each of which is associated with the registration information corresponding to a party stored in the first communication history data, the third control unit displays an image corresponding to one of the two or more image data and displays a menu for selecting one of images respectively corresponding to the two or more image data; and
a fourth control unit configured, such that, when one of images corresponding to the two or more image data is selected through the menu, the fourth control unit displays a selected image selected through the menu on the display screen.

7. The communication device according to claim 6, wherein the third control unit is configured, such that, if two or more image data are stored, each of which is associated with the registration information corresponding to a party stored in the first communication history data, the third control unit displays preferentially an image corresponding to the image data associated with the registration information corresponding to a party corresponding to a latest history in the first communication history data.

8. The communication device according to claim 6,
further comprising a second history storage unit configured, such that, when information designating a party for communication is inputted in a state where an image is displayed on the display screen, the second history storage unit stores a communication history representing the designated party for communication and the image data corresponding to the image being displayed on the display screen while associating the communication history with the image data corresponding to the image being displayed,
wherein the third control unit is configured, such that, if two or more image data are stored, each of which is associated with the registration information corresponding to a party stored in the first communication history data, the third control unit displays preferentially an image corresponding to the image data which is associated with both of the registration information corresponding to a party stored in the first communication history data and the registration information corresponding to a communication history stored in the second history storage unit.

9. The communication device according to claim 6, wherein:
the first history storage unit is configured, such that, if a message is inputted from a party who requested communication is received, the first history storage unit stores the message from the party in association with the first communication history data; and
the third control unit is configured, such that, if two or more image data are stored, each of which is associated with the registration information corresponding to a party stored in the first communication history data, the third control unit displays preferentially an image corresponding to the image data associated with the registration information corresponding to a party stored in the first communication history data in association with the message.

10. The communication device according to claim 6, wherein the third control unit is configured, such that, if two or more image data are stored, each of which is associated with the registration information corresponding to a party stored in the first communication history data, the third control unit displays preferentially an image corresponding to the image data associated with two or more registration information corresponding to a plurality of parties stored in the first communication history data.

11. The communication device according to claim 6,
further comprising a touch panel configured to detect a position pointed by a pointing device on the display screen,
wherein the fourth control unit is configured, such that, when a designated position designated in relation to the menu displayed by the fourth control unit is detected by the touch panel, the fourth control unit displays, on the display screen, an image corresponding to the image data which is selected from the two or more image data and corresponds to the designated position.

12. The communication device according to claim 1, further comprising:
a received data storage unit configured to store received data received from a source which transmitted a communication request through the communication unit; and
a transfer unit configured to transfer the received data to the one of the plurality communication partners specified by the input inputted through the input accepting unit,
wherein:
the output control unit treats the source of the received data as the source which transmitted the communication request;
the output control unit comprises a fifth control unit configured, such that, in response to a command input with respect to the image displayed by the first control unit, the fifth control unit displays, on the display screen, an image corresponding to the image data associated with the registration information; and
the input accepting unit is configured, such that, in response to designation of an area corresponding to the registration information in the registration information storage unit, the input accepting unit inputs, as a transfer destination, information specifying one of the plurality of communication partners of the communication contained in the registration information associated with the area designated through the input accepting unit to the communication unit.

13. The communication device according to claim 12, wherein the fifth control unit is configured to display the image corresponding to the image data which is associated with both the registration information corresponding to the source of the received data and registration information not corresponding to the source of the received data.

14. The communication device according to claim 12,
further comprising a touch panel configured to detect a position pointed by a pointing device on the display screen,
wherein the output control unit comprises a sixth control unit configured, such that, if a designated position which is in the image being displayed on the display screen and is detected by the touch panel corresponds to an area corresponding to the registration information, the sixth control unit displays the registration information associated with the area corresponding to the designated position on the display screen.

15. The communication device according to claim 12, wherein the output control unit is configured to display an image corresponding to image data associated with two or more registration information respectively corresponding to a plurality of sources of received data stored by the received data storage unit, such that areas respectively corresponding to the plurality of sources are distinguished from each other.

16. The communication device according to claim 12, wherein:
the registration information includes first information representing a name of a party, a second information identifying the party, and third information which is additional information concerning the party other than the name and the second information;
the display screen has a rectangular shape having a longer side and a shorter side; and
the output control unit comprises a seventh control unit configured, such that, when the image corresponding to the image data associated with the registration information is displayed, the seventh control unit displays the image in a first display area which is one of a plurality of display areas obtained by dividing the display screen into two parts along the longer side of the display screen, and displays the first information, the second information, and the third information of the registration information corresponding to the source of the received data in the other of the plurality of display areas.

17. The communication device according to claim 12, wherein the output control unit comprises:
an eighth control unit configured, such that, when two or more images corresponding to two or more image data associated with the registration information are displayed, the eighth control unit displays a menu for selecting one of the two or more images respectively corresponding to the two or more image data; and
a ninth control unit configured, such that when one of the two or more images corresponding to the two or more image data is selected through the menu, the ninth control unit displays a selected image selected through the menu on the display screen.

18. The communication device according to claim 17,
further comprising a touch panel configured to detect a position pointed by a pointing device on the display screen,
wherein the ninth control unit is configured, such that, when a designated position designated in relation to the menu displayed by the ninth control unit is detected by the touch panel, the ninth control unit displays, on the display screen, an image which is selected from the two or more images and corresponds to the designated position.

19. The communication device according to claim 1, wherein the input accepting unit is configured to accept a communication request transmitted from one of the one or more external devices as the input specifying the one of the plurality of communication partners.

20. A communication device according comprising:
a display screen;
a communication unit configured to communicate with an external device;
an image data storage unit configured to store image data;
a registration information storage unit configured to store registration information and area information corresponding to a plurality of areas defined in the image data in such a manner that the area information is associated with the registration information;
an output control unit configured to control onscreen representation on the display screen;
a received data storage unit configured to store received data received from a source which transmitted a communication request through the communication unit;
a transfer destination input unit configured to input information concerning a transfer destination to which the received data from the source is to be transferred; and
a transfer unit configured to transfer the received data to the transfer destination designated by the information inputted through the transfer destination input unit,
wherein:
the output control unit comprises a first control unit configured to display an image corresponding to the image data associated with the registration information corresponding to a source which transmitted a communication request, such that an area defined by the area information associated with the registration information corresponding to the source which transmitted the communication request is distinguished from other areas defined by corresponding area information;
the output control unit comprises a second control unit configured, such that, in response to a command input with respect to the image displayed by the first control unit, the second control unit displays an image corresponding to the image data associated with the registration information on the display screen;
the output control unit treats the source of the received data as the source which transmitted the command request;
the transfer destination input unit is configured, such that, in response to designation of an area corresponding to the area information associated with the registration information in the registration information storage unit, the transfer destination input unit inputs, as a transfer destination, information specifying a party for communication contained in the registration information associated with the area designated through the transfer destination input unit to the communication unit;
the received data to be transferred by the transfer unit includes page data;
the communication device further comprises a page data automatic creation unit configured to create page data including information specifying the source of the received data to be transferred by the transfer unit; and
the transfer unit is configured to add the page data created by the page data automatic creation unit to the received data, and to transfer the received data to which the page data created by the page data automatic creation unit is added.

21. A non-transitory computer readable medium having computer readable instructions stored thereon that are executed by a processor of a communication device, wherein:
the communication device comprises:
a display screen,
a communication unit configured to communicate with one or more external devices,
an input accepting unit configured to accept input specifying one of a plurality of communication partners,
an image data storage unit configured to store image data, and
a registration information storage unit configured to store association information representing associations between a plurality of registration information, at least one image data, and a plurality of areas defined in the at least one image data;
each of the plurality of registration information is associated with one of the plurality of communication partners;
with respect to the at least one image data, the plurality of registration information is associated with the at least one image data;
with respect to the at least one image data, the plurality of areas are associated with the at least one image data, at least one of the plurality of registration information is associated with one area of the plurality of areas, and the at least one of the plurality of registration information that is associated with the one area of the plurality of areas is not associated with other of the plurality of areas; and
executing the instructions configures the processor to perform the steps of:
when the input accepting unit accepts an input specifying one of the plurality of communication partners, displaying an image corresponding to the at least one image data associated with the specified one of the plurality of communication partners, regardless of which of the plurality of registration information is associated with the one of the plurality of communication partners specified by the input, and
when the image displayed corresponds to the at least one image data that is associated with the registration information corresponding to one of the communication partners specified by the input, displaying an area of the plurality of areas with which the registration information corresponding to one of the communication partners specified by the input is associated in a first style, and displaying areas of the plurality of areas with which the registration information corresponding to one of the communication partners specified by the input is not associated in a second style different from the first style.

22. The non-transitory computer readable medium according to claim 21,
wherein the communication device further comprises:
a received data storage unit configured to store received data received from a source which transmitted a communication request through the communication unit; and
a transfer unit configured to transfer the received data to the one of the plurality of communication partners specified by the input inputted through the input accepting unit,
wherein the source of the received data is treated as the source which transmitted the communication request, and wherein executing the instructions further configures the processor to perform the steps of:
displaying, on the display screen, an image corresponding to the one or more image data associated with the registration information in response to a command input with respect to the image displayed by the step of displaying the image;
inputting, as the one of the plurality of communication partners of the communication, information specifying a party for communication contained in the registration information associated with an area designated through the input accepting unit in response to designation of the area associated with the registration information in the registration information storage unit, to the communication unit.

23. A communication device, comprising:
a display screen;
a communication unit configured to communicate with one or more external devices;
an input accepting unit configured to accept input specifying one of a plurality communication partners;
an registration information storage unit configured to store association information representing associations between a plurality of registration information and a plurality of areas defined in a display image; and
an output control unit configured to control onscreen representation of the display image on the display screen,
wherein:
each of the plurality of registration information is associated with one of the plurality of communication partners,
with respect to the at least one image data, the plurality of registration information is associated with the at least one image data,
with respect to the at least one image data, the plurality of areas are associated with the at least one image data, at least one of the plurality of registration information is associated with one area of the plurality of areas, and the at least one of the plurality of registration information that is associated with one area of the plurality of areas is not associated with the other of the plurality of areas,
when the input accepting unit accepts an input specifying one of the plurality of communication partners, the output control unit displays an image corresponding to the display image associated with the specified one of the plurality of communication partners, regardless of which of the plurality of registration information is associated with the one of the plurality of communication partners specified by the input, and
when the image displayed by the output control unit corresponds to the display image that is associated with the registration information corresponding to one of the communication partners specified by the input accepting unit, the output control unit displays an area of the plurality of areas with which the registration information corresponding to one of the communication partners specified by the input accepting unit is associated in a first style, and displays areas of the plurality of areas with which the registration information corresponding to one of the communication partners specified by the input accepting unit is not associated in a second style different from the first style.

24. A non-transitory computer readable medium having computer readable instructions stored thereon that are executed by a processor of a communication device, wherein:

the communication device comprises:
a display screen,
a communication unit configured to communicate with one or more external devices,
an input accepting unit configured to accept input specifying one of a plurality of communication partners,
a registration information storage unit configured to store association information representing associations between a plurality of registration information and a plurality of areas defined in a display image;
each of the plurality of registration information is associated with one of the plurality of communication partners;
with respect to the at least one image data, the plurality of registration information is associated with the at least one image data;
with respect to the at least one image data, the plurality of areas are associated with the at least one image data, at least one of the plurality of registration information is associated with one area of the plurality of areas, and the at least one of the plurality of registration information that is associated with one area of the plurality of areas is not associated with the other of the plurality of areas; and executing the instructions configures the processor to perform the steps of:
when the input accepting unit accepts an input specifying one of the plurality of communication partners, displaying an image corresponding to display image associated with the specified one of the plurality of communication partners, regardless of which of the plurality of registration information is associated with the one of the plurality of communication partners specified by the input, and
when the image displayed corresponds to the display image that is associated with the registration information corresponding to one of the communication partners specified by the input, displaying an area of the plurality of areas with which the registration information corresponding to one of the communication partners specified by the input is associated in a first style, and displaying areas of the plurality of areas with which the registration information corresponding to one of the communication partners specified by the input is not associated in a second style different from the first style.

* * * * *